(12) United States Patent
Kono et al.

(10) Patent No.: US 9,141,849 B2
(45) Date of Patent: Sep. 22, 2015

(54) MONITORING APPARATUS, METHOD, AND PROGRAM

(75) Inventors: Ryosuke Kono, Ichinomiya (JP); Shingo Kawamoto, Ichinomiya (JP); Mitsunori Sugiura, Mizuho (JP)

(73) Assignee: OMRON Corporation, Kyoto (JP)

( * ) Notice: Subject to any disclaimer, the term of this patent is extended or adjusted under 35 U.S.C. 154(b) by 147 days.

(21) Appl. No.: 13/825,434

(22) PCT Filed: Nov. 25, 2011

(86) PCT No.: PCT/JP2011/077175
§ 371 (c)(1),
(2), (4) Date: Jul. 8, 2013

(87) PCT Pub. No.: WO2012/090629
PCT Pub. Date: Jul. 5, 2012

(65) Prior Publication Data
US 2013/0272584 A1    Oct. 17, 2013

(30) Foreign Application Priority Data
Dec. 28, 2010 (JP) ................................. 2010-293785

(51) Int. Cl.
*G06K 9/00* (2006.01)
*G07F 17/32* (2006.01)

(52) U.S. Cl.
CPC ........ *G06K 9/00288* (2013.01); *G06K 9/00295* (2013.01); *G06K 9/00771* (2013.01); *G07F 17/3206* (2013.01); *G07F 17/3237* (2013.01)

(58) Field of Classification Search
None
See application file for complete search history.

(56) References Cited

U.S. PATENT DOCUMENTS 5,394,409 A * 2/1995 Barthel et al. ................. 714/815
7,634,662 B2 * 12/2009 Monroe ......................... 713/186

(Continued)

FOREIGN PATENT DOCUMENTS

| JP | 11-175730 A | 7/1999 |
| JP | 2001-178958 A | 7/2001 |

(Continued)

OTHER PUBLICATIONS

International Search Report mailed Dec. 20, 2011 for Application No. PCT/JP2011/077175 (5 Pages).

*Primary Examiner* — Chan Park
*Assistant Examiner* — Iman K Kholdebarin
(74) *Attorney, Agent, or Firm* — Nutter McClennen & Fish LLP; John J. Penny, Jr.; Michael P. Visconti, III

(57) ABSTRACT

A suspicious person determination unit determines whether the face image of a matching target person is registered in a biological information DB by a matching result of a matching unit. When the face image of the matching target person is registered, area storage stores a specified area while correlating the specified area with a personal ID. A provisional registration unit makes a provisional registration of a suspicious person flag while correlating the suspicious person flag with the personal ID when a pattern of the specified area is a behavioral pattern of a suspicious person. A definitive registration unit makes a definitive registration of the suspicious person flag while correlating with the personal ID, when the provisional registration of the suspicious person flag is made for the face image of the matching target person, and when the face image of the matching target person is captured at a premium exchange counter.

9 Claims, 22 Drawing Sheets

(56) References Cited

U.S. PATENT DOCUMENTS

| | | | |
|---|---|---|---|
| 7,869,657 B2* | 1/2011 | Podilchuk | 382/218 |
| 8,254,633 B1* | 8/2012 | Moon et al. | 382/103 |
| 2005/0084140 A1* | 4/2005 | Kakadiaris et al. | 382/118 |
| 2007/0127788 A1* | 6/2007 | Kakinuma et al. | 382/118 |
| 2009/0287370 A1* | 11/2009 | Iwai et al. | 701/33 |
| 2012/0294496 A1* | 11/2012 | Nakamoto | 382/118 |
| 2013/0108123 A1* | 5/2013 | Hwang et al. | 382/118 |
| 2013/0163814 A1* | 6/2013 | Takiguchi | 382/103 |
| 2013/0182918 A1* | 7/2013 | Kovtun et al. | 382/118 |
| 2013/0236071 A1* | 9/2013 | Ishikawa et al. | 382/118 |
| 2013/0266196 A1* | 10/2013 | Kono et al. | 382/118 |
| 2013/0272584 A1* | 10/2013 | Kono et al. | 382/118 |
| 2014/0094297 A1* | 4/2014 | Adachi et al. | 463/29 |
| 2014/0129487 A1* | 5/2014 | Adachi et al. | 706/11 |
| 2014/0187324 A1* | 7/2014 | Masuda | 463/31 |
| 2014/0226877 A1* | 8/2014 | Je et al. | 382/118 |
| 2014/0348400 A1* | 11/2014 | Ohta | 382/118 |

FOREIGN PATENT DOCUMENTS

| | | | | |
|---|---|---|---|---|
| JP | 2001178958 A | * | 7/2001 | A63F 7/02 |
| JP | 2006-236255 A | | 9/2006 | |
| JP | 2006-333913 A | | 12/2006 | |
| JP | 2007-020653 A | | 2/2007 | |
| JP | 2009-000367 A | | 1/2009 | |
| JP | 2009-246799 A | | 10/2009 | |

* cited by examiner

Fig. 13

| Camera ID | Area | Entrance/exit |
|---|---|---|
| 1 | Store | Entrance |
| 2 | Store | Entrance |
| 3 | Store | Entrance |
| 4 | Store | Exit |
| 5 | Store | Exit |
| 6 | Store | Exit |
| 7 | One-yen corner | Entrance |
| 8 | One-yen corner | Exit |
| 9 | Four-yen corner | Entrance |
| 10 | Four-yen corner | Exit |
| 11 | Toilet | Entrance |
| 12 | Amusement machine having machine number 001 | — |
| 13 | Amusement machine having machine number 002 | — |
| 14 | Amusement machine having machine number 003 | — |
| 15 | Amusement machine having machine number 005 | — |

Fig. 14

| Personal ID | Date and time | Area |
|---|---|---|
| 1 | 2010/10/1 10:00 | Enter store |
| 1 | 2010/10/5 10:01 | Starts game with amusement machine having machine number 001 |
| 1 | 2010/10/5 10:06 | Ends game with amusement machine having machine number 001 |
| 2 | 2010/10/2 10:06 | Enter store |
| 1 | 2010/10/3 10:08 | Exit from store |
| 1 | 2010/10/4 10:10 | Enter store |
| 2 | 2010/10/2 10:12 | Enter into one-yen corner |
| 3 | 2010/10/3 10:15 | Enter store |
| 1 | 2010/10/5 10:12 | Starts game with amusement machine having machine number 001 |
| 1 | 2010/10/5 10:20 | Ends game with amusement machine having machine number 001 |
| 1 | 2010/10/3 10:25 | Exit from store |
| 1 | 2010/10/4 10:30 | Enter store |
| 1 | 2010/10/5 10:50 | Starts game with amusement machine having machine number 001 |
| 1 | 2010/10/5 10:55 | Ends game with amusement machine having machine number 001 |
| 1 | 2010/10/3 11:00 | Exit from store |
| 1 | 2010/10/4 11:05 | Enter store |

Rows 5–6: A
Rows 11–12: B
Rows 15–16: C

Fig. 15

| Suspicious person ID | Face image | Suspicious person flag |
|---|---|---|
| 1 | 😊 | Definitive registration |
| 2 | 😊 | Provisional registration |
| 3 | 😊 | Definitive registration |
| 4 | 😊 | |
| 5 | 😊 | Provisional registration |
| 6 | 😊 | |

Fig. 16

| Pattern ID | Pattern | Threshold |
|---|---|---|
| | | The number of times |
| 1 | Exit from store → enter into store | At least three times/hour |
| 2 | Exit from store → enter into store | At least ten times/day |
| 3 | Enter toilet → exit from toilet | At least five times/hour |

Fig. 17

| Pattern ID | Condition |
|---|---|
| 1 | Staying time at four-yen corner does not exist, but exchange rate information is four yen. |
| 2 | Staying time at the four-yen corner is less than 10 minutes, and exchange rate information is four yen while the number of game balls is greater than or equal to 10000. |

MONITORING APPARATUS, METHOD, AND PROGRAM

BACKGROUND

1. Technical Field

The present invention relates to monitoring apparatus, method, and program, particularly to monitoring apparatus, method, and program, which can properly monitor management of shop visit and illegal action of a player.

2. Background Art

Recently, there are proposed technologies of capturing a face image of the player in an amusement shop to monitor the management of shop visit and the illegal action.

For one of the proposed technologies, the following is proposed. For register of a suspicious person, using a face image in the amusement shop, based on illegal action information detected in an amusement machine, the face image of a person playing a game with the amusement machine is registered as the face image of the suspicious person (see Patent Document 1).

There is also proposed a technology of managing a visit and leaving history by capturing the face image of the player who visits the shop with cameras placed in an entrance and an exit (for example, see Patent Document 2).

Patent Document 1: Japanese Unexamined Patent Publication No. 2001-178958

Patent Document 2: Japanese Unexamined Patent Publication No. 2007-020653

However, in the technology of Patent Document 1, in the case where the illegal action cannot be detected in the amusement machine, there is a likelihood of not being able to register the face image of the player as the suspicious person.

In the technology of Patent Document 2, due to natural light or disturbance light, such as headlights of a vehicle, sometimes the face image of the player cannot be well captured at a doorway of the store when the player visits the amusement shop. In such cases where a determination that the player who visits the store does not exist or a determination that the player who visits the store does not leave the store is made, there is a likelihood that the player who visits the store cannot be correctly managed or monitored.

Many cameras are placed in the doorway as means for preventing a failure to capture the face image. Although the failure to capture the face image can be avoided to some extent, there is a likelihood that the management becomes complicated because the number of cameras that capture the image of the doorway is increased to capture the same person plural times.

In view of the foregoing, an object of at least one embodiment of the present invention is to be able to properly manage the visit of the player and monitor the illegal action of the suspicious person such that the registered face image can properly be managed while the face image of the person to be registered is correctly registered.

SUMMARY OF THE INVENTION

In accordance with an aspect of at least one embodiment of the present invention, a monitoring apparatus including: image capturing means for capturing a face image of a matching target person; accumulation means for accumulating the face image of an accumulator in an accumulator database; area storage means for storing an area where the face image is captured with respect to each of the plurality of image capturing means; area specifying means for specifying the area where the face image of the matching target person is captured by the image capturing means based on information stored in the area storage means; matching means for performing matching by calculating a degree of similarity between the face image of the matching target person and the face image of the accumulator stored in the accumulator database; matching determination means for determining whether the face image of the matching target person is matched with the face image registered in the accumulator database by comparing the degree of similarity, which is of a matching result of the matching means, to a predetermined threshold; area history storage means for storing the area specified by the area specifying means in an area history database while correlating the area with identification information identifying the face image of the accumulator when the face image of the matching target person is matched with the face image registered in the accumulator database; provisional registration means for making a provisional registration of a predetermined flag while correlating the predetermined flag with the face image corresponding to the identification information in the accumulator database when a pattern of the area, which is stored in the area history database while correlated with the identification information of the face image, is a predetermined area pattern; and definitive registration means for making a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area.

The predetermined flag may be a flag indicating a suspicious person who takes an illegal action in the accumulators.

The predetermined pattern may be a pattern of an area where the matching target person possibly takes an illegal action.

The predetermined area may be an area, where the matching target person emerges with a high probability when taking an illegal action.

The predetermined area may be an area near a premium exchange counter, at which the matching target person emerges with a high probability when taking an illegal action in an amusement shop.

The monitoring apparatus may further includes alarm activation means for activating an alarm that the matching target person is a suspicious person who takes an illegal action when the face image of the matching target person is matched with the face image of the accumulator in which the predetermined flag is registered in the accumulator database.

The definitive registration means may make the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, when the face image of the matching target person is captured in a predetermined area, and when the matching target person takes a predetermined behavioral pattern taken by a suspicious person.

In accordance with another aspect of at least one embodiment of the present invention, a method for monitoring a monitoring apparatus including: image capturing means for capturing a face image of a matching target person; accumulation means for accumulating the face image of an accumulator in an accumulator database; area storage means for storing an area where the face image is captured with respect to each of the plurality of image capturing means; area specifying means for specifying the area where the face image of the matching target person is captured by the image capturing means based on information stored in the area storage means; matching means for performing matching by calculating a degree of similarity between the face image of the matching target person and the face image of the accumulator stored in the accumulator database; matching determination means for determining whether the face image of the matching target person is matched with the face image registered in the accumulator database by comparing the degree of similarity, which is of a matching result of the matching means, to a predetermined threshold; area history storage means for storing the area specified by the area specifying means in an area history database while correlating the area with identification information identifying the face image of the accumulator when the face image of the matching target person is matched with the face image registered in the accumulator database; provisional registration means for making a provisional registration of a predetermined flag while correlating the predetermined flag with the face image corresponding to the identification information in the accumulator database when a pattern of the area, which is stored in the area history database while correlated with the identification information of the face image, is a predetermined area pattern; and definitive registration means for making a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area, the monitoring method comprising: an image capturing step, in the image capturing means, of capturing the face image of the matching target person; an area specifying step, in the area specifying means, of specifying the area where the face image of the matching target person is captured through the image capturing step based on the information stored in the area storage means; a matching step, in the matching means, of performing matching by calculating the degree of similarity between the face image of the matching target person and the face image of the accumulator stored in the accumulator database; a matching determination step, in the matching determination means, of determining whether the face image of the matching target person is matched with the face image registered in the accumulator database by comparing the degree of similarity, which is of the matching result in the matching step, to the predetermined threshold; an area history storage step, in the area history storage means, of storing the area specified through the area specifying step in the area history database while correlating the area with the identification information identifying the face image of the accumulator when the face image of the matching target person is matched with the face image registered in the accumulator database; a provisional registration step, in the provisional registration means, of making the provisional registration of the predetermined flag while correlating the predetermined flag with the face image corresponding to the identification information in the accumulator database when the pattern of the area, which is stored in the area history database while correlated with the identification information of the face image, is the predetermined area pattern; and a definitive registration step, in the definitive registration means, of making the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in the predetermined area.

In accordance with still another aspect of at least one embodiment of the present invention, a program that causes a computer to perform processing, the computer controlling a monitoring apparatus including: image capturing means for capturing a face image of a matching target person; accumulation means for accumulating the face image of an accumulator in an accumulator database; area storage means for storing an area where the face image is captured with respect to each of the plurality of image capturing means; area specifying means for specifying the area where the face image of the matching target person is captured by the image capturing means based on information stored in the area storage means; matching means for performing matching by calculating a degree of similarity between the face image of the matching target person and the face image of the accumulator stored in the accumulator database; matching determination means for determining whether the face image of the matching target person is matched with the face image registered in the accumulator database by comparing the degree of similarity, which is of a matching result of the matching means, to a predetermined threshold; area history storage means for storing the area specified by the area specifying means in an area history database while correlating the area with identification information identifying the face image of the accumulator when the face image of the matching target person is matched with the face image registered in the accumulator database; provisional registration means for making a provisional registration of a predetermined flag while correlating the predetermined flag with the face image corresponding to the identification information in the accumulator database when a pattern of the area, which is stored in the area history database while correlated with the identification information of the face image, is a predetermined area pattern; and definitive registration means for making a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area, the processing including: an image capturing step, in the image capturing means, of capturing the face image of the matching target person; an area specifying step, in the area specifying means, of specifying the area where the face image of the matching target person is captured through the image capturing step based on the information stored in the area storage means; a matching step, in the matching means, of performing matching by calculating the degree of similarity between the face image of the matching target person and the face image of the accumulator stored in the accumulator database; a matching determination step, in the matching determination means, of determining whether the face image of the matching target person is matched with the face image registered in the accumulator database by comparing the degree of similarity, which is of the matching result in the matching step, to the predetermined threshold; an area history storage step, in the area history storage means, of storing the area specified through the area specifying step in the area history database while correlating the area with the identification information identifying the face image of the accumulator when the face image of the matching target person is matched with the face image registered in the accumulator database; a provisional registration step, in the provisional registration means, of making the provisional registration of the predetermined flag while correlating the predetermined flag with the face image corresponding to the identification information in the accumulator database when the pattern of the area, which is stored in the area history database while correlated with the identification information of the face image, is the predetermined area pattern; and a definitive registration step, in the definitive registration means, of making the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in the predetermined area.

In one aspect of at least one embodiment of the present invention, the face image of the matching target person is captured, the face image of the accumulator is accumulated in the accumulator database, the area where the face image is captured with respect to each of the plurality of image capturing means is stored, the area where the face image of the matching target person is captured is specified based on stored information, the degree of similarity between the face image of the matching target person and the face image of the accumulator stored in the accumulator database are calculated and matched, whether the face image of the matching target person is matched with the face image registered in the accumulator database is determined by comparing the degree of similarity, which is of the matching result of the matching means, to the predetermined threshold, the specified area is stored in the area history database while correlated with identification information identifying the face image of the accumulator when the face image of the matching target person is matched with the face image registered in the accumulator database, the provisional registration of a predetermined flag is made while the predetermined flag is correlated with the face image corresponding to the identification information in the accumulator database when the pattern of the area, which is stored the area history database while correlated with the identification information of the face image, is a predetermined area pattern, and the definitive registration of the predetermined flag is made while the predetermined flag is correlated with the face image of the matching target person in the accumulator database, when the face image of the matching target person is matched with the face image of the accumulator in which the provisional registration of the predetermined flag is made in the accumulator database, and when the face image of the matching target person is captured in the predetermined area.

In the monitoring apparatus in accordance with one aspect of at least one embodiment of the present invention, for example, the image capturing means for capturing the face image of the matching target person is an entrance camera, an in-store camera, and an exit camera, the accumulation means for accumulating the face image of the accumulator in the accumulator database is, for example, a biological information database, the area storage means for storing an area where the face image is captured with respect to each of the plurality if image capturing means is, for example, an area table, the area specifying means for specifying the area where the face image of the matching target person is captured by the image capturing means based on information stored in the area storage means is, for example, an area specifying unit, the matching means for performing matching by calculating a degree of similarity between the face image of the matching target person and the face image of the accumulator stored in the accumulator database is, for example, a matching unit, the matching determination means for determining whether the face image of the matching target person is matched with the face image registered in the accumulator database by comparing the degree of similarity, which is of a matching result of the matching means, to the predetermined threshold is, for example, a suspicious person determination unit, the area history storage means for storing the area specified by the area specifying means in the area history database while correlating the area with identification information identifying the face image of the accumulator when the face image of the matching target person is matched with the face image registered in the accumulator database is, for example, an area movement history recording unit, the provisional registration means for making a provisional registration of a predetermined flag while correlating the predetermined flag with the face image corresponding to the identification information in the accumulator database when a pattern of the area, which is stored in the area history database while correlated with the identification information of the face image, is the predetermined area pattern is, for example, a provisional registration unit, and the definitive registration means for making a definitive registration of the predetermined flag while correlating the predetermined flag with the face image of the matching target person in the accumulator database when the face image of the matching target person is matched with the face image of the accumulator in which the provisional registration of the predetermined flag is made in the accumulator database and when the face image of the matching target person is captured in a predetermined area is, for example, a definitive registration unit.

That is, every time the face image of the matching target person is captured, the provisional registration of the predetermined flag, for example, the flag indicating the suspicious person is made in the accumulator database, when the area of the image capturing position is accumulated in the area history database, and when the pattern of the area where the face image is captured is matched with the predetermined pattern, namely, the pattern of the area where the image is probably captured when the person is suspected of the illegal action in the amusement shop. The definitive registration of the predetermined flag, namely, the flag indicating the suspicious person is made in the accumulator database, when the face image of the matching target person for whom the provisional registration of the predetermined flag, for example, the flag indicating the suspicious person is made is captured in the specific area, for example, the area in which the image is surely captured in taking the illegal action and which is located near the premium exchange counter in the amusement shop.

Therefore, the provisional registration of the flag indicating the suspicious person can be made only for the face image of the person having a high possibility to take the illegal action among the matching target persons. The definitive registration is made as the suspicious person in the accumulator database only when the face image of the person for whom the provisional registration of the suspicious person flag is made is captured in the area where the illegal action is clearly taken.

As a result, while correlated with the face image, the suspicious person flag can be automatically registered as the accumulator in the data base in a stepwise manner, such as the provisional registration and the definitive registration.

According to at least one embodiment of the present invention, the visit of the player can properly be managed and the illegal action of the suspicious person can properly be monitored.

BRIEF DESCRIPTION OF THE DRAWINGS

FIG. 13 is a view illustrating a configuration example of an area table.

FIG. 14 is a view illustrating a configuration example of a biological information database.

FIG. 15 is a view illustrating a configuration example of an area movement history database.

FIG. 16 is a view illustrating an example of a pattern table in suspicious person provisional registration processing.

FIG. 17 is a view illustrating an example of a pattern table in suspicious person definitive registration processing.

DESCRIPTION OF THE PREFERRED EMBODIMENTS

Embodiments of the present invention are described below.

Figure 1:
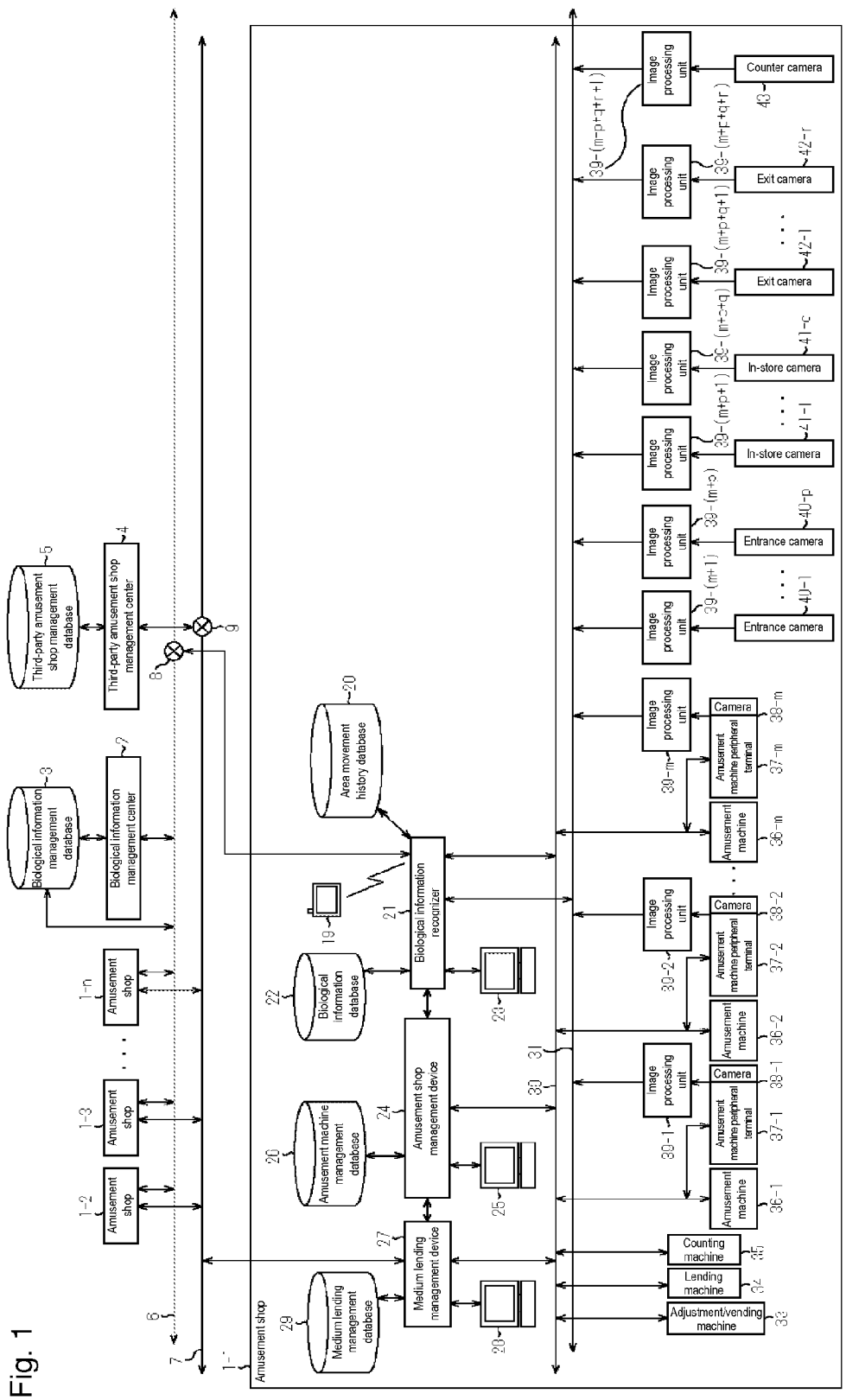
FIG. 1 is a view illustrating a configuration of a monitoring system according to an embodiment of the present invention.

A monitoring apparatus in accordance with an aspect of at least one embodiment of the present invention includes: image capturing means (for example, an entrance camera 40, an in-store camera 41, an exit camera 42, and a counter camera 43 in FIG. 1) for capturing a face image of a matching target person; accumulation means (for example, a biological information database 22 in FIG. 10) for accumulating the face image of an accumulator in an accumulator database; area storage means (for example, an area table 229a in FIG. 10) for storing an area where the face image is captured with respect to each of the plurality of image capturing means; area specifying means (for example, an area specifying unit 229 in FIG. 10) for specifying the area where the face image of the matching target person is captured by the image capturing means based on information stored in the area storage means; matching means (for example, a matching unit 222 in FIG. 10) for performing matching by calculating a degree of similarity between the face image of the matching target person and the face image of the accumulator stored in the accumulator database; matching determination means (for example, a suspicious person determination unit 227 in FIG. 10) for determining whether the face image of the matching target person is matched with the face image registered in the accumulator database by comparing the degree of similarity, which is of a matching result of the matching means, to a predetermined threshold; area history storage means (for example, an area movement history recording unit 228 in FIG. 10) for storing the area specified by the area specifying means in an area history database (for example, an area movement history DB 20 in FIG. 10) while correlating the area with identification information identifying the face image of the accumulator when the face image of the matching target person is matched with the face image registered in the accumulator database; provisional registration means (for example, a provisional registration unit 242 in FIG. 10) for making a provisional registration of a predetermined flag while correlating the predetermined flag with the face image corresponding to the identification information in the accumulator database when a pattern of the area, which is stored in the area history database while correlated with the identification information of the face image, is a predetermined area pattern; and definitive registration means (for example, a definitive registration unit 244 in FIG. 10) for making a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area.

Figure 10:
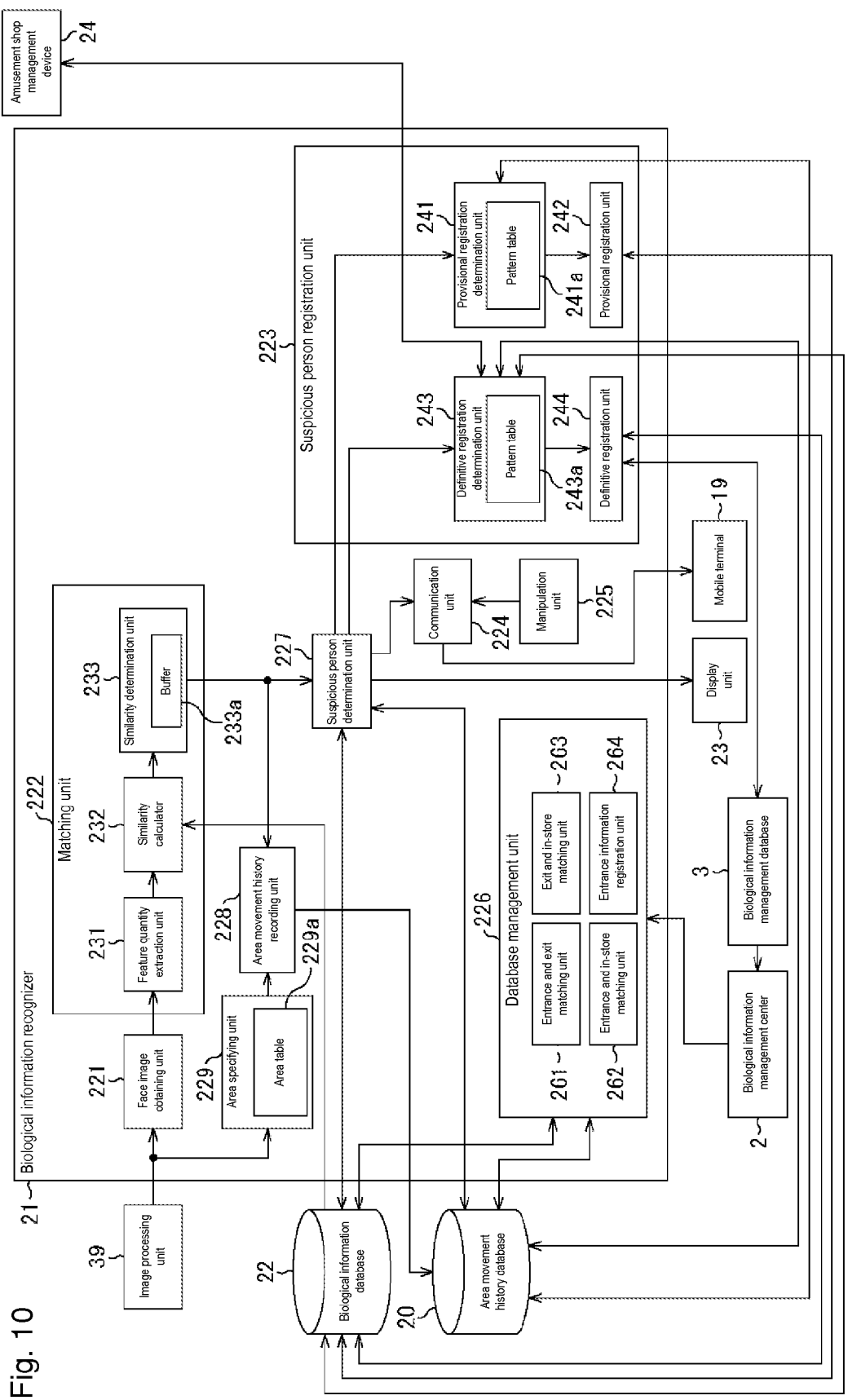
FIG. 10 is a view illustrating a configuration example of a biological information recognizer of the first embodiment.

The monitoring apparatus may further includes alarm activation means (for example, a display unit 23, a communication unit 224, and a mobile terminal 19 in FIG. 10) for activating an alarm that the matching target person is a suspicious person who takes an illegal action when the face image of the matching target person is matched with the face image of the accumulator in which the predetermined flag is registered in the accumulator database.

A method for monitoring a monitoring apparatus in accordance with another aspect of at least one embodiment of the present invention including: image capturing means for capturing a face image of a matching target person; accumulation means for accumulating the face image of an accumulator in an accumulator database; area storage means for storing an area where the face image is captured with respect to each of the plurality of image capturing means; area specifying means for specifying the area where the face image of the matching target person is captured by the image capturing means based on information stored in the area storage means; matching means for performing matching by calculating a degree of similarity between the face image of the matching target person and the face image of the accumulator stored in the accumulator database; matching determination means for determining whether the face image of the matching target person is matched with the face image registered in the accumulator database by comparing the degree of similarity, which is of a matching result of the matching means, to a predetermined threshold; area history storage means for storing the area specified by the area specifying means in an area history database while correlating the area with identification information identifying the face image of the accumulator when the face image of the matching target person is matched with the face image registered in the accumulator database; provisional registration means for making a provisional registration of a predetermined flag while correlating the predetermined flag with the face image corresponding to the identification information in the accumulator database when a pattern of the area, which is stored the area history database while correlated with the identification information of the face image, is a predetermined area pattern; and definitive registration means for making a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area, the monitoring method includes: an image capturing step (for example, Step S2 in FIG. 11), in the image capturing means, of capturing the face image of the matching target person; an area specifying step (for example, Step S26 in FIG. 11), in the area specifying means, of specifying the area where the face image of the matching target person is captured through the image capturing step based on the information stored in the area storage means; a matching step (for example, Step S24 in FIG. 11), in the matching means, of performing matching by calculating the degree of similarity between the face image of the matching target person and the face image of the accumulator stored in the accumulator database; a matching determination step (for example, Step S28 in FIG. 11), in the matching determination means, of determining whether the face image of the matching target person is matched with the face image registered in the accumulator database by comparing the degree of similarity, which is of the matching result in the matching step, to the predetermined threshold; an area history storage step (for example, Step S27 in FIG. 11), in the area history storage means, of storing the area specified through the area specifying step in the area history database while correlating the area with the identification information identifying the face image of the accumulator when the face image of the matching target person is matched with the face image registered in the accumulator database; a provisional registration step (for example, Step S37 in FIG. 11), in the provisional registration means, of making the provisional registration of the predetermined flag while correlating the predetermined flag with the face image corresponding to the identification information in the accumulator database when the pattern of the area, which is stored the area history database while correlated with the identification information of the face image, is the predetermined area pattern; and a definitive registration step (for example, Step S35 in FIG. 11), in the definitive registration means, of making the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in the predetermined area.

Embodiments of the present invention will be described below. The description is made as follows.

1. First embodiment (an example singularly performed by a biological information recognizer)
2. Second embodiment (an example performed based on a staff manipulation of an amusement shop in response to information presented by the biological information recognizer)

First Embodiment

Configuration Example of Monitoring System of First Embodiment

FIG. 1 is a view illustrating a configuration example of an amusement shop monitoring system according to an embodiment of the present invention.

Amusement shops 1-1 to 1-$n$ are what are called pachinko parlors, pachisuro (a slot machine in the pachinko parlor) parlors, or casinos. The amusement shops 1-1 to 1-$n$ are also affiliated stores or member stores of a biological information management center or a third-party amusement shop management center. In the amusement shops 1-1 to 1-$n$, a plurality of stores need to be integrally managed. The amusement shops 1-1 to 1-$n$ are connected to one another by a biological information management bus 6 and a third-party amusement shop management bus 7. The amusement shops 1-1 to 1-$n$ transmit and receive biological information and third-party amusement shop management information to and from one another through the buses 6 and 7 and public communication line networks 8 and 9 typified by the Internet. Hereinafter, the amusement shops 1-1 to 1-$n$ are simply referred to as an amusement shop 1 unless otherwise noted. It is assumed that the same holds true for other configurations.

The biological information management bus 6 acts as a transmission line through which the biological information mainly managed by a biological information recognizer 21 of each amusement shop 1 flows. The third-party amusement shop management bus 7 acts as a transmission line through which the medium lending management information mainly managed by a medium lending management device 27 of each amusement shop 1 flows.

A biological information management center 2 is a server that is used by a business operator who manages and operates the biological information management center. The biological information management center 2 updates a registered player database (hereinafter also referred to as a DB) managed in a biological information management database 3 based on an unregistered player DB generated by each amusement shop 1, and distributes the updated latest registered player DB to the biological information recognizer 21 of each amusement shop 1.

A third-party amusement shop management center 4 is a server that is used by a business operator who manages and operates the third-party amusement shop management center. The third-party amusement shop management center 4 updates a DB including medium lending management information, which is managed in a third-party amusement shop management database (DB) 5, based on information supplied from each amusement shop 1, and distributes the updated latest medium lending management information to the medium lending management device 27 of each amusement shop 1.

The biological information recognizer 21 matches a face image, which is captured by cameras 38-1 to 38-$m$, entrance cameras 40-1 to 40-$p$, in-store cameras 41-1 to 41-$q$, exit cameras 42-1 to 42-$r$, and a counter camera 43, against a face image previously registered in a biological information DB 22, based on information on a face image extracted by image processing units 39-1 to 39-($m+p+q+r+1$) and supplied through a biological information bus 31. When the face images match up with each other, the face image is registered in an area movement history database 20 together with information specifying the captured area while correlated with the matched face image or a personal ID identifying the face image. The biological information recognizer 21 makes a provisional registration of a suspicious person flag indicating a suspicious person while correlating the suspicious person flag with the face image of the biological information database 22, when a pattern of the area that emerges frequently in taking illegal action is detected based on the information on the area that is registered in the movement history database 20 while correlated with the personal ID. Additionally, in the case where the provisional registration of the suspicious person flag is made, the biological information recognizer 21 makes a definitive registration of the suspicious person flag, when a behavioral pattern is registered in the area movement history database 20 in taking the illegal action while the suspicious person is captured at a premium exchange counter that the suspicious person always uses. When the face image matches up with the face image to which the suspicious person flag is added, the biological information recognizer 21 notifies a mobile terminal 19 that the suspicious person, normally, a person registered as the illegal player visits the amusement shop, or activates an alarm by displaying the visit of the suspicious person on a display unit 23 including an organic EL (Electronic Luminescent) or an LCD (Liquid Crystal Display). When the face image does not match up with the face image previously registered in the biological information database 22, the biological information recognizer 21 accesses a biological information management database 3 to register the face image as an unregistered person in an unregistered player DB (not illustrated). Among the face images captured with the entrance camera 40, the biological information recognizer 21 matches the face image that cannot clearly be captured by overexposure due to back light or light of a head lamp of a vehicle during nighttime against the face image captured with the in-store camera 41 or the exit camera 42. When the face images match up with each other, the face image is replaced with clear one.

An amusement shop management device 24 is what is called a hall computer, and monitors operations of amusement machines 36-1 to 36-$m$ through an amusement shop management information bus 30. The amusement shop management device 24 performs predetermined processing and displays a processing result on a display unit 25 including the organic EL or the LCD based on information on the number of balls acquired by a player or the number of payout medals in each amusement machine 36, player's call information on each amusement machine 36-1 to 36-$m$, or monitoring states, such as error generation. Using an amusement machine management DB 26, the amusement shop management device 24 manages pieces of information supplied from a counting machine 35, the amusement machines 36-1 to 36-$m$, and amusement machine peripheral terminals 37-1 to 37-$m$ while correlating each of the pieces of information with identification information (for example, an amusement machine identification number) identifying each amusement machine 36.

Using a medium lending management DB 29, the medium lending management device 27 manages medium lending management information on a lent amusement medium based on pieces of information from an adjustment/vending machine 33 and a lending machine 34. When the medium lending management information registered in the medium lending management DB 29 is updated, the medium lending management device 27 transmits the updated information to the third-party amusement shop management center 4 through the third-party amusement shop management bus 7 and the public communication line network 9. The medium lending management device 27 obtains the medium lending management information supplied from the third-party amusement shop management center 4 through the third-party amusement shop management bus 7 and the public communication line network 9, and accumulates the medium lending management information in the medium lending management DB 29.

In the case where the player plays the amusement machine 36, the lending machine 34 lends the amusement medium to the player according to a predetermined amount of money when receiving the amount of money in cash or by a prepaid card. At this point, the lending machine 34 supplies information on the number of lent amusement mediums to the medium lending management device 27 together with information on the received amount of money or a balance of the prepaid card. Therefore, the medium lending management device 27 registers the information on the number of lent amusement mediums in the medium lending management database 29 together with the information on the received amount of money or the balance of the prepaid card.

The adjustment/vending machine 33 sells the prepaid card with units to borrow the ball. At this point, the adjustment/vending machine 33 supplies the units of the sold prepaid card and the amount of paid money to the medium lending management device 27. The adjustment/vending machine 33 adjusts an account and pays money based on the balance of the amusement medium that is lent as the units of the prepaid card. At this point, the adjustment/vending machine 33 supplies the balance of the prepaid card and the amount of refunded money to the medium lending management device 27.

Figure 8:
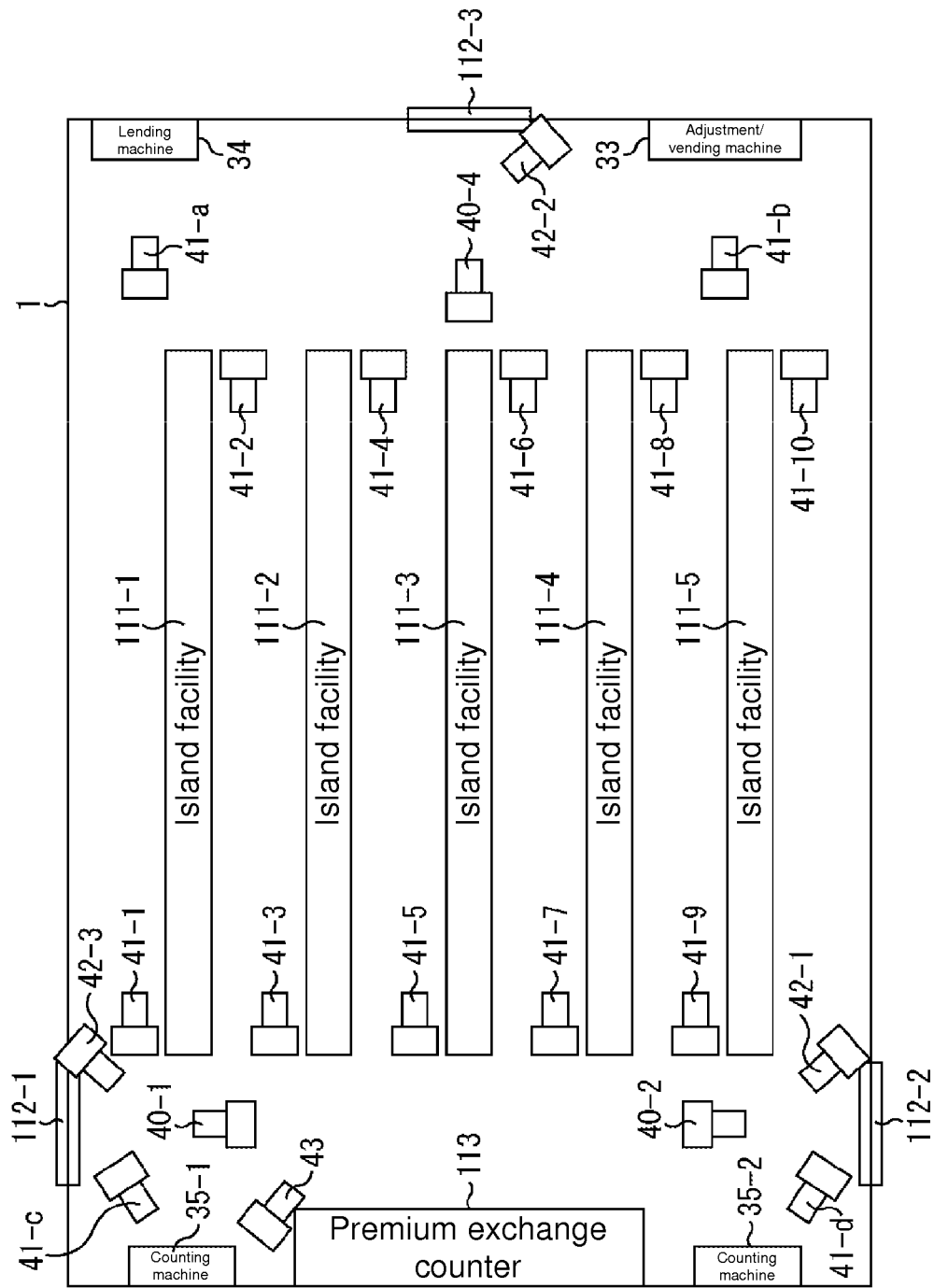
FIG. 8 is a view illustrating an installation example of an entrance camera, an exit camera, and an in-store camera in FIG. 1.

The counting machine 35 counts the number of amusement mediums acquired by the player in playing the amusement machine 36, and outputs a counting result in the form of a magnetic card or a receipt. As illustrated in FIG. 8, in the case where the amusement medium is the game ball, the counting machine 35 includes a counting machine 35-1 for one yen per ball and a counting machine 35-2 for four yen per ball.

The player performs a predetermined manipulation to cause each of the amusement machines 36-1 to 36-$m$ to perform the game, and each of the amusement machines 36-1 to 36-$m$ pays the game ball or the medal according to what is called a small hit or a big hit.

The amusement machine peripheral terminals 37-1 to 37-$m$ are what are called inter-machine devices that are provided corresponding to the amusement machines 36-1 to 36-$m$, and an inter-machine vending machine (identical to the lending machine 34 in principle) is provided. The amusement machine peripheral terminal 37 obtains the biological information on the face image of the player who plays the amusement machine 36, and the amusement machine peripheral terminal 37 transmits the biological information to the biological information recognizer 21 together with the amusement machine identification information (the amusement machine identification number). In FIG. 1, by way of example, the cameras 38-1 to 38-$m$ that capture the face image of the player are provided as a function of obtaining the biological information.

Figure 2:
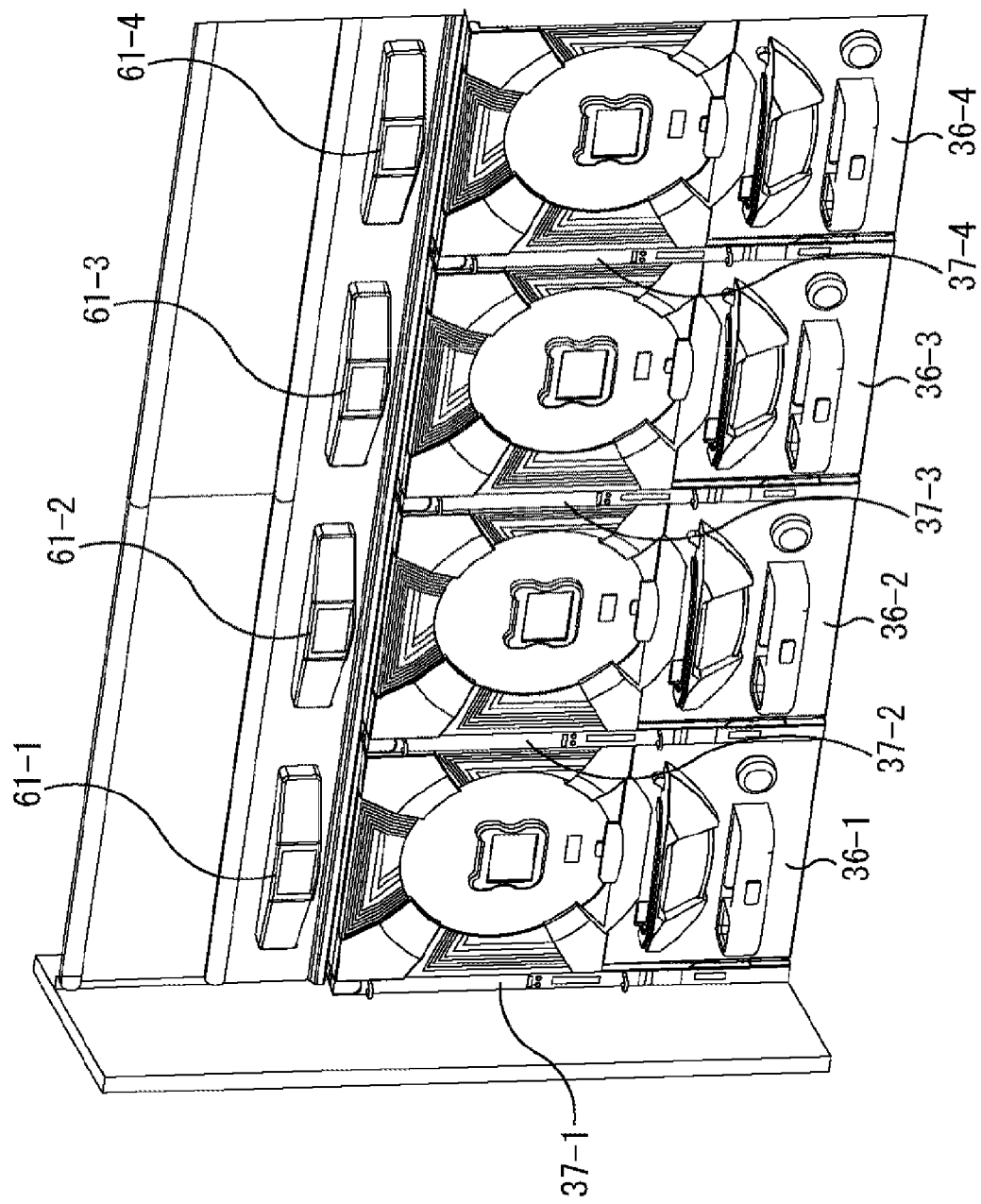
FIG. 2 is a view illustrating an installation example of cameras in FIG. 1.
Figure 3:
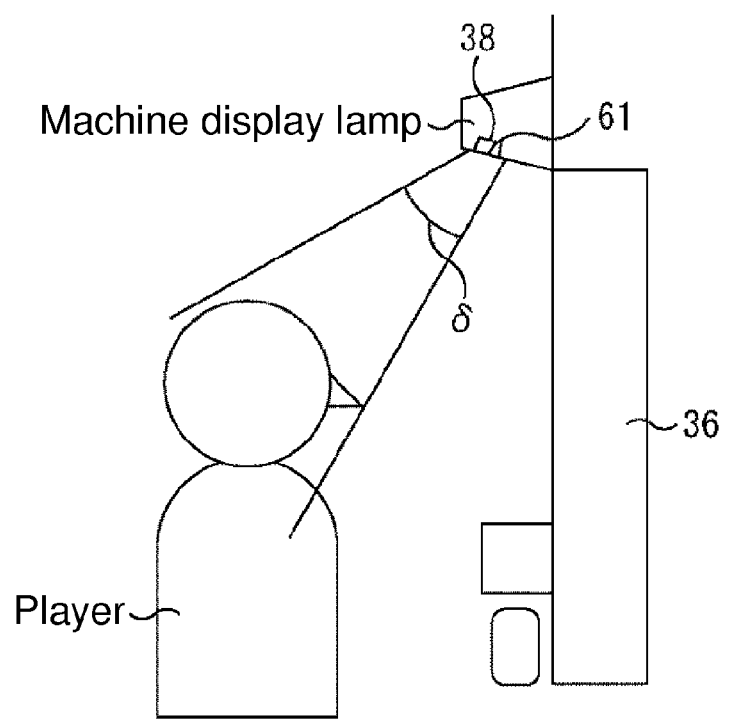
FIG. 3 is a view illustrating an installation example of the camera in FIG. 1.

For example, the cameras 38-1 to 38-*m* may be provided below machine display lamps 61-1 to 61-4 provided, respectively, in upper portions of the amusement machines 36-1 to 36-4 as illustrated in FIG. 2 such that the face image of the player is captured within a read range δ as illustrated in FIG. 3. Therefore, each camera ID can be simultaneously used as an amusement machine ID.

Figure 4:
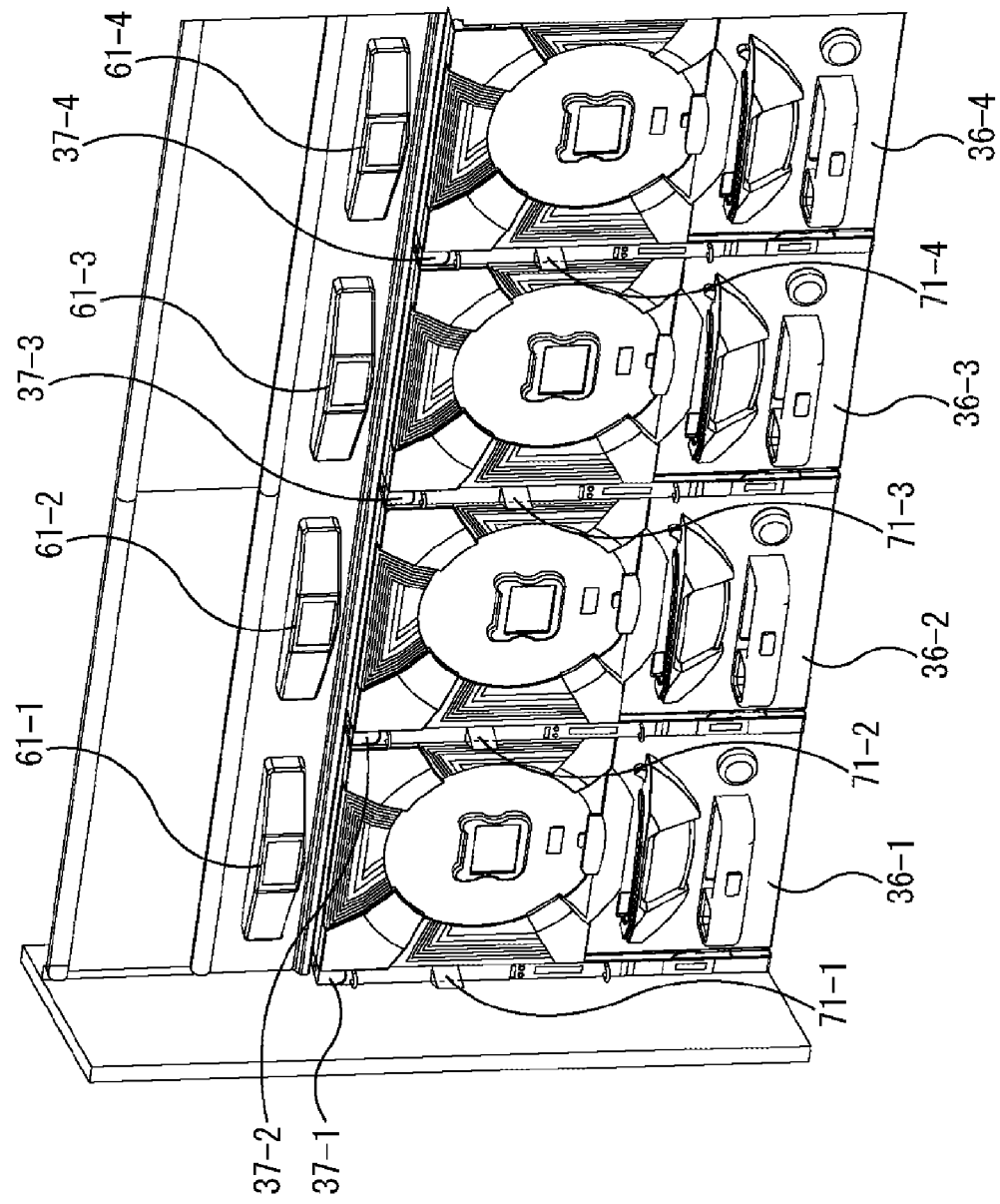
FIG. 4 is a view illustrating an installation example of the cameras in FIG. 1.
Figure 5:
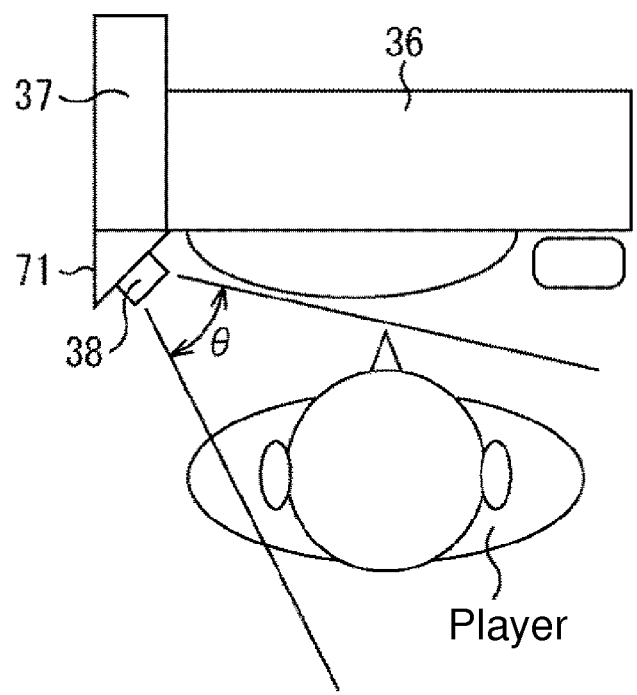
FIG. 5 is a view illustrating an installation example of the camera in FIG. 1.

For example, in the cameras 38-1 to 38-*m*, projections 71-1 to 71-4 may be provided in the amusement machine peripheral terminals 37-1 to 37-4 as illustrated in FIG. 4 such that the face image of the player is captured within a read range 8 as illustrated in FIG. 5.

Figure 6:
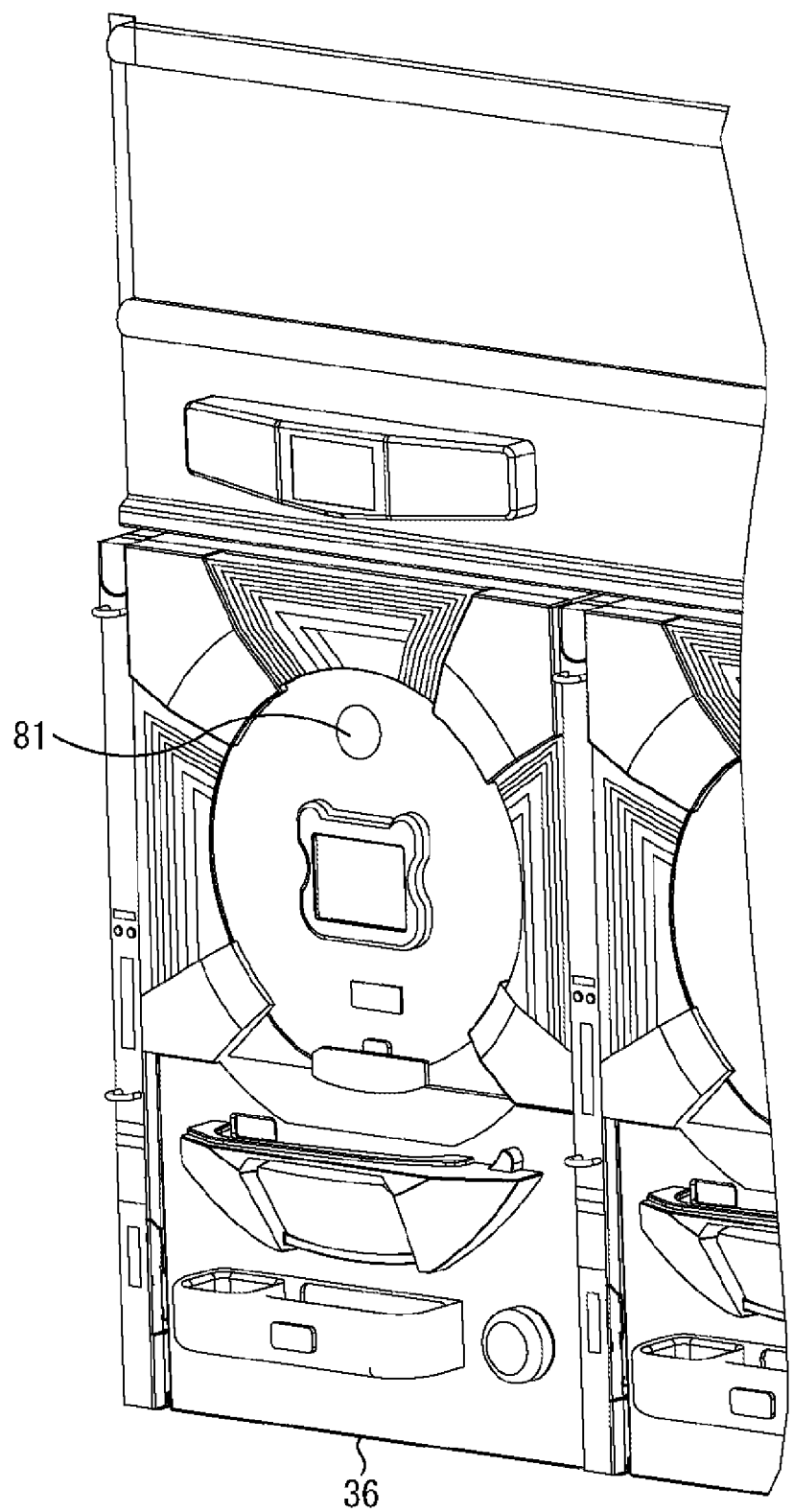
FIG. 6 is a view illustrating an installation example of the camera in FIG. 1.
Figure 7:
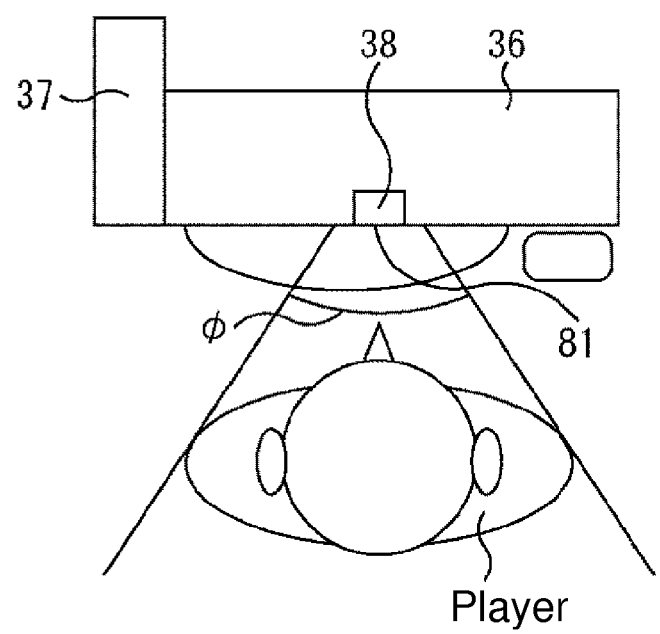
FIG. 7 is a view illustrating an installation example of the camera in FIG. 1.

For example, as illustrated in FIG. 6, the face image of the player may be captured such that each of the cameras 38-1 to 38-*m* is provided in a central portion (on a board of the amusement machine 36) of the amusement machine 36. That is, the camera 38 is installed in an installation unit 81 in FIG. 6, thereby capturing the face image of the player within a read range φ as illustrated in FIG. 7.

The entrance cameras 40-1 to 40-*p*, the in-store cameras 41-1 to 41-*q*, the exit cameras 42-1 to 42-*r*, and the counter camera 43 are installed at doorways and predetermined sites in the amusement shop 1, and supply the captured images to the image processing units 39-(*m*+1) to 39-(*m*+*p*+*q*+*r*+1), respectively.

For example, the entrance cameras 40-1 to 40-*p*, the in-store cameras 41-1 to 41-*q*, the exit cameras 42-1 to 42-*r*, and the counter camera 43 are installed as illustrated in FIG. 8. FIG. 8 illustrates an installation example of the entrance cameras 40-1 to 40-*p*, the in-store cameras 41-1 to 41-*q*, the exit cameras 42-1 to 42-*r*, and the counter camera 43 in the amusement shop 1.

In FIG. 8, doorways 112-1 to 112-3 are provided, and the entrance cameras 40-1 to 40-3 capture the players who are entering the amusement shop 1 through the doorways 112, respectively. The exit cameras 42-1 to 42-3 capture the players who are leaving the store through the doorways 112, respectively. The in-store cameras 41-1 to 41-10 are installed at positions in each of which the in-store camera 41 can capture both surfaces of each of the island facilities 111-1 to 111-5 in line. The amusement machines 36 are installed on both surfaces of the island facility 111, namely, the amusement machines 36 are installed such that the island facility 111 in FIG. 8 is vertically sandwiched therebetween. The counter camera 43 captures the image of the player who exchanges the game ball acquired by the game or the receipt obtained by counting the medal using the counting machine 35 to a premium corresponding to the number of acquired game balls or the receipt at the premium exchange counter 113. Each of the camera 38, the entrance camera 40, the in-store camera 41, the exit camera 42, and the counter camera 43 has a pan-tilt-zoom function. Therefore, as illustrated in FIG. 8, the in-store cameras 41-1 to 41-10 are disposed, which allows the images of all the players who are playing the amusement machines 36 to be captured by any one of the in-store cameras 41-1 to 41-10.

The in-store camera 41-*a* is provided in front of the lending machine 34, the in-store camera 41-*b* is provided in front of the adjustment/vending machine 33, the in-store camera 41-*c* is provided in front of the one-yen/ball counting machine 35-1, and the in-store camera 41-*d* is provided in front of the four-yen/ball counting machine 35-2. Therefore, the image of the player who uses the lending machine 34, the adjustment/vending machine 33, and the counting machines 35-1 and 35-2 can be captured.

That is, the camera 38, the entrance camera 40, the in-store camera 41, the exit camera 42, and the counter cameras 43 are installed in the amusement shop 1 such that almost all behaviors expected to be taken in the amusement shop 1 by players, such as the player who visits and leaves the amusement shop 1, the player who plays the amusement machine 36, and the player who uses the lending machine 34, the adjustment/vending machine 33, or the counting machines 35-1 and 35-2, can be monitored as illustrated in FIG. 8. The in-store cameras 41 are not disposed in a doorway of a toilet and each place in the amusement shop, where the illegal action is easily performed although the amusement machine 36 is not placed. However, the in-store cameras 41 may be provided in the doorway and the place where the illegal action is easily performed (not illustrated).

[Configuration Example of Image Processing Unit]

Figure 9:
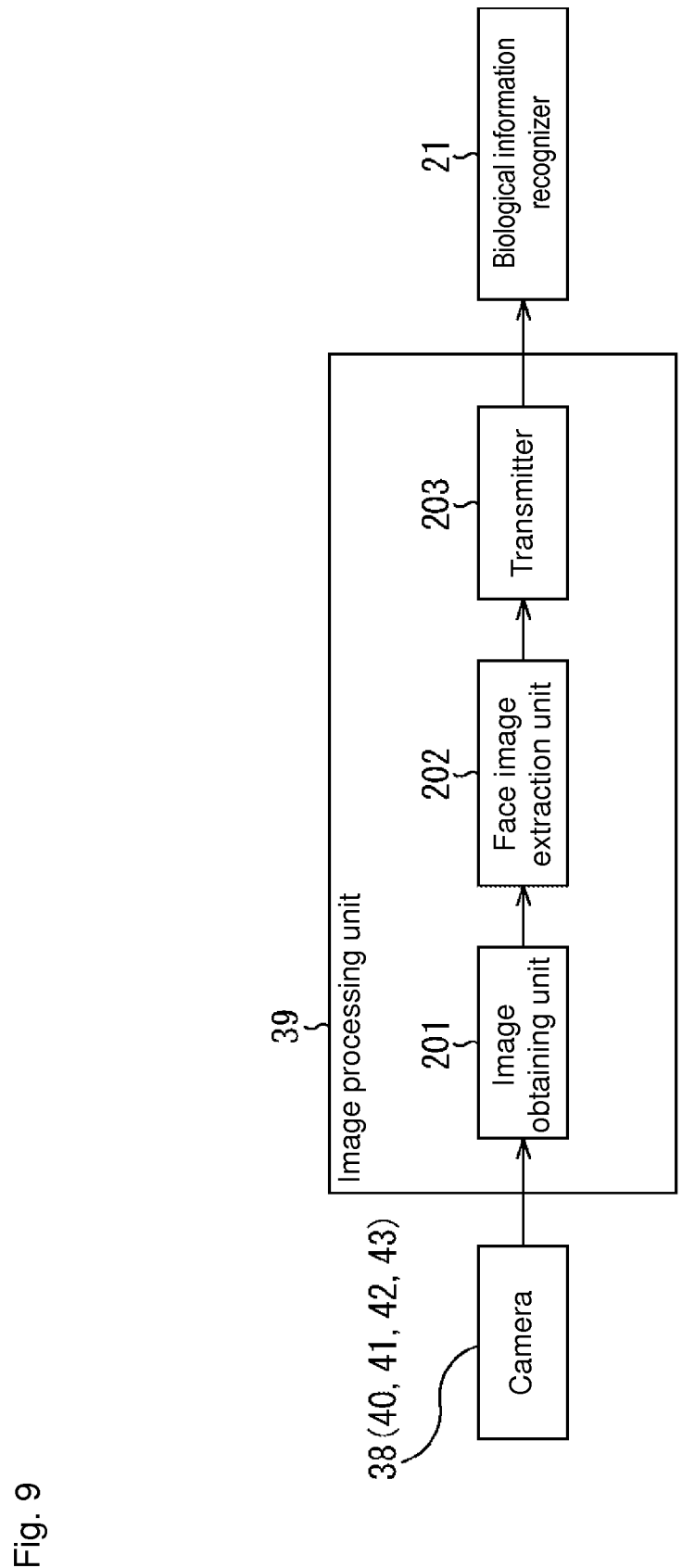
FIG. 9 is a view illustrating a configuration example of an image processing unit in FIG. 1.

A configuration example of the image processing unit 39 will be described below with reference to FIG. 9.

An image obtaining unit 201 obtains the image captured by the camera 38 (or the entrance camera 40 or the in-store camera 41), and supplies the image to a face image extraction unit 202. The face image extraction unit 202 extracts a rectangular image including the face image in the image supplied from the image obtaining unit 201 using a pattern in which regions constituting a face are disposed. The face image extraction unit 202 supplies the rectangular image to a transmitter 203. The transmitter 203 transmits the face image to the biological information recognizer 21.

[Configuration Example of Biological Information Recognizer]

A configuration example of the biological information recognizer 21 will be described below with reference to FIG. 10.

A face image obtaining unit 221 obtains the face image supplied from the image processing unit 39, and supplies the face image to a matching unit 222 and an area specifying unit 229. The matching unit 222 matches the face image obtained by the face image obtaining unit 221 against the face image of the registered player who is previously registered in the biological information DB 22, and the matching unit 222 supplies a matching result including a degree of similarity to a suspicious person determination unit 227 together with the face image. Based on the degree of similarity, the suspicious person determination unit 227 obtains a determination result of whether the face image obtained by the face image obtaining unit 221 is the face image of the person registered in the biological information DB 22. When the face image obtained by the face image obtaining unit 221 is the face image of the person registered in the biological information DB 22, the suspicious person determination unit 227 determines whether the face image is the suspicious person based whether the definitive registration or the provisional registration of the suspicious person flag is made while correlated with the face image. The suspicious person determination unit 227 supplies the determination result to a suspicious person registration unit 223.

More particularly, a feature quantity extraction unit 231 of the matching unit 222 extracts a feature quantity used to identify the face image, and supplies the feature quantity to a similarity calculator 232 together with the face image. The similarity calculator 232 extracts the feature quantity of the face image of the registered player registered in the biological information DB 22. Using the feature quantity supplied from the feature quantity extraction unit 231, the similarity calculator 232 obtains the degree of similarity to the face images of all the registered players registered in the biological information DB 22. The similarity calculator 232 supplies the face image supplied from the face image obtaining unit 221 and the face image having the top degree of similarity to a similarity determination unit 233. More specifically, the similarity calculator 232 obtains a sum of absolute differences, average percentage, and a sum of ratios as the degree of similarity based on various face feature quantities, such as an interval between eyes and a ratio of a length from a chin to a forehead and a length from the chin to a nose.

The similarity determination unit 233 accumulates the degree of similarity supplied from the similarity calculator 232 in a buffer 233a, and compares the top degree of similarity of the face image to a predetermined threshold. In the case where the registered face image having the top degree of similarity is similar to the face image supplied from the face image obtaining unit 221 (when the degree of similarity of the registered face image is higher than the predetermined threshold for the degree of similarity indicating the higher degree of similarity with increasing degree of similarity, or when the degree of similarity of the registered face image is lower than the predetermined threshold for the degree of similarity indicating the higher degree of similarity with decreasing degree of similarity) based on the comparison result, the similarity determination unit 233 supplies the face image having the top degree of similarity and the information on the degree of similarity to the suspicious person determination unit 227. The similarity determination unit 233 compares the top degree of similarity of the face image to a predetermined threshold. When the registered face image having the top degree of similarity is not similar to the face image supplied from the face image obtaining unit 221, the similarity determination unit 233 registers the top degree of similarity of the face image in an unregistered player database (not illustrated) based on the comparison result.

In the case where the face image is the player for whom the definitive registration of the suspicious person flag is made based on the matching result from the matching unit 222, the suspicious person determination unit 227 notifies the display unit 23 that the illegal player, namely, the suspicious person visits the amusement shop 1, and controls a communication unit 224 to notify the mobile terminal 19 owned by the staff of the amusement shop 1 that the illegal player visits the amusement shop 1. In the case where the matching result from the matching unit 222 indicates that the face image is not one for which the definitive registration of the suspicious person flag is made, the suspicious person determination unit 227 supplies the information on the face image to the suspicious person registration unit 223.

When the suspicious person determination unit 227 supplies the face image, which is assumed to be the face image in the biological information DB 22 to make the provisional registration of the suspicious person flag although the definitive registration of the suspicious person flag is not made, to the suspicious person registration unit 223, the suspicious person registration unit 223 determines whether the definitive registration is made. When the provisional registration of the suspicious person flag is not made, the suspicious person registration unit 223 determines whether the provisional registration of the suspicious person flag is made. More particularly, the suspicious person registration unit 223 includes a provisional registration determination unit 241, a provisional registration unit 242, a definitive registration determination unit 243, and a definitive registration unit 244. When notified of the face image of the matching result, the provisional registration determination unit 241 accesses the area movement history DB 20 to read a history of an area, which is registered while correlated with the personal ID identifying the face image in which the face image is captured. The provisional registration determination unit 241 determines whether the provisional registration of the suspicious person flag is made based on whether the area is matched with an area pattern, which is stored in a pattern table 241a and captured when the suspicious person takes the illegal action. The provisional registration determination unit 241 notifies the provisional registration unit 242 of a determination result. When the provisional registration determination unit 241 issues an instruction to makes the provisional registration, the provisional registration unit 242 accesses the biological information DB 22 to make the provisional registration of the suspicious person flag with respect to the corresponding face image. When notified of the face image in which the provisional registration of the suspicious person flag is made in the matching result, the definitive registration determination unit 243 obtains an amusement history of the person of the face image from the amusement shop management device 24 while correlating the amusement history with the personal ID identifying the face image, and the definitive registration determination unit 243 determines whether the suspicious person flag of the definitive registration is made based on whether the amusement history is matched with the behavioral pattern, which is stored in a pattern table 243a and performed by the suspicious person in taking the illegal action. The definitive registration determination unit 243 notifies the definitive registration unit 244 of the determination result. When the definitive registration determination unit 243 issues the instruction to make the definitive registration, the definitive registration unit 244 accesses the biological information DB 22 to make the definitive registration of the suspicious person flag with respect to the corresponding face image.

A manipulation unit 225 includes a button, a mouse, a keyboard, and the like. The manipulation unit 225 generates a manipulation signal when a predetermined operation is performed.

At this point, for example, it is assumed that the degree of similarity indicates a higher value as the face image comes close to the face image registered as the registered player indicated by the sum of ratios. An example in which the face image is determined to be the face image of the registered player corresponding to the degree of similarity when the degree of similarity is higher than the predetermined threshold will be described. However, for example, in the case where the degree of similarity is expressed by the sum of absolute differences in feature quantity between the captured face image and the face image registered as the registered player, the similarity determination unit 233 regards the captured face image as the face image of the registered player when the degree of similarity is lower than a threshold. Alternatively, in the case of the average ratio, the similarity determination unit 233 can regard the captured face image as the face image of the registered player when the degree of similarity is greater than or equal to a predetermined value and is a value close to 1 in the range of 0 to 1.

When a new registered player database is distributed from the biological information management center 2, the database management unit 226 updates the biological information DB 22 based on the registered player database. In the case where the entrance camera 40 cannot clearly capture the face image, for example, due to the back light in visiting the amusement store 1 or the overexposure by the light of the head lamp of the vehicle during the nighttime, the database management unit 226 replaces the face image with the face image that is clearly captured with the in-store camera 41 or the exit camera 42 in the biological information DB 22. Therefore, for example, processing of collecting the area movement history can be performed for each player based on the face image captured with the entrance camera 40.

More particularly, the database management unit 226 includes an entrance and exit matching unit 261, an entrance and in-store matching unit 262, an exit and in-store matching unit 263, and an entrance information registration unit 264. The entrance and exit matching unit 261 searches the face image, which is not matched with the face image captured in the area near the entrance among the face images captured in the area near the exit through the face image matching, as a first mismatched face image based on the information in the area history information DB 20. The entrance and in-store matching unit 262 searches the face image, which is not matched with the face image captured in the area near the entrance among the face images captured in the store through the face image matching, as a second mismatched face image based on the information in the area history information DB 20. The exit and in-store matching unit 263 specifies the matched face image by determining whether the face image is matched with the first and second mismatched face images of the entrance and exit matching unit 261 and the entrance and in-store matching unit 262. The entrance information registration unit 264 registers the face image, which is specified by the exit and in-store matching unit 263 and captured at a clock time closest to a clock time at which the face image is initially captured in the face images common to the two mismatched face images, instead of the face image captured with the in-store camera 41 or the face image that is captured with the exit camera 42 in the entrance area.

An area specifying unit 229 specifies the area where the obtained image is captured from the camera ID identifying the camera that captures the image supplied from the image processing unit 39. More particularly, the area specifying unit 229 includes an area table 229a, and specifies the area where the supplied image is captured based on the information on the placement area of the camera that is registered while correlated with the camera ID registered in the area table 229a.

When the matching result is matched with the face image registered in the biological information DB 22, an area movement history recording unit 228 updates the area movement history DB 20 while correlating the matching result with the information from the corresponding area specifying unit 229.

[Monitoring Processing Performed by Biological Information Recognizer 21 in FIG. 10]

Next, monitoring processing performed by the biological information recognizer 21 in FIG. 10 will be described below with reference to a flowchart in FIG. 11.

In Step S1, the entrance camera 40, the in-store camera 41, the exit camera 42, or the counter camera 43 determines whether a predetermined time elapses, and repeats the determination processing until the predetermined time elapses.

When the predetermined time elapses in Step S1, the entrance camera 40, the in-store camera 41, the exit camera 42, or the counter camera 43 captures the image in a placed range and supplies the captured image to the image processing unit 39 in Step S2. The image obtaining unit 201 of the image processing unit 39 obtains the supplied image, and supplies the image to the face image extraction unit 202.

In Step S3, the face image extraction unit 202 extracts the face image of the player from the supplied image and supplies the face image to the transmitter 203. More specifically, the face image extraction unit 202 extracts the face image from the dispositions of the characteristic regions, such as the eyes and the nose, in which skin is exposed, from a color of the captured image, and the face image extraction unit 202 supplies the face image to the transmitter 203.

In Step S4, the transmitter 203 transmits the face image supplied by the face image extraction unit 202 to the biological information recognizer 21. At this point, the transmitter 203 transmits the face image to the biological information recognizer 21 while adding pieces of information, such as the camera ID identifying each of the camera 38, the entrance camera 40, and the in-store camera 41 and information on the image capturing time, to the face image.

In Step S21, the face image obtaining unit 221 of the biological information recognizer 21 obtains the face image. In Step S22, the face image obtaining unit 221 extracts one of unprocessed face images in the supplied face images, and supplies the unprocessed face image to the feature quantity extraction unit 231.

In Step S23, the feature quantity extraction unit 231 of the matching unit 222 extracts the feature quantity from the supplied face image, and supplies the feature quantity to the similarity calculator 232 together with the face image.

In Step S24, the similarity calculator 232 performs similarity calculation processing.

[Similarity Calculation Processing]

Figure 12:
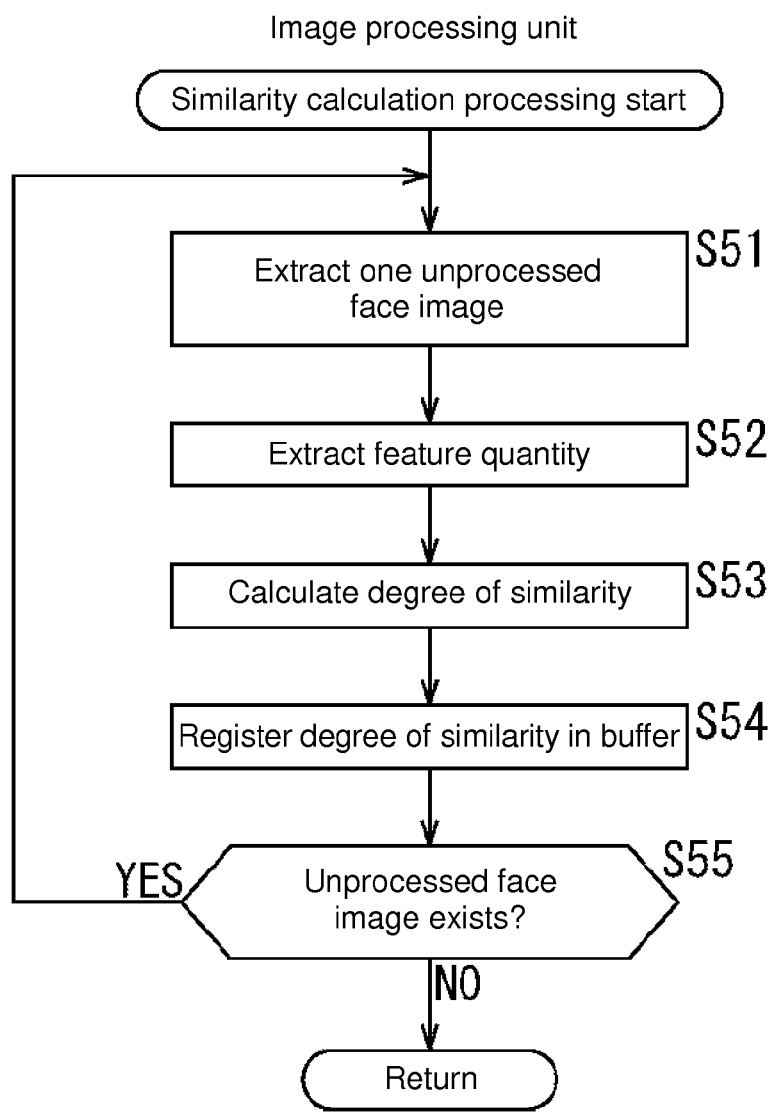
FIG. 12 is a flowchart illustrating similarity calculation processing in FIG. 11.

Here, the similarity calculation processing will be described below with reference to a flowchart in FIG. 12.

In Step S51, the similarity calculator 232 extracts one of unprocessed face images of the registered players among the face images registered in the biological information DB 22, and sets the extracted face image to a processing target.

In Step S52, the similarity calculator 232 extracts the feature quantity similar to the feature quantity supplied by the feature quantity extraction unit 231 from the face image, which is set to the processing target and registered in the biological information DB 22.

In Step S53, the similarity calculator 232 calculates the sum of absolute differences, the average percentage, and the sum of ratios as the degree of similarity using various face feature quantities, such as the interval between the eyes and the ratio of the length from the chin to the forehead and the length from the chin to the nose, with respect to the face image supplied by the feature quantity extraction unit 231 and the similar feature quantities in the face image registered in the biological information DB 22. In Step S54, the similarity calculator 232 supplies the degree of similarity to the face image, which is registered in the biological information DB 22 as the calculation result, to the similarity determination unit 233, and the similarity calculator 232 causes the similarity determination unit 233 to register the degree of similarity in the buffer 233a.

In Step S55, the similarity calculator 232 determines whether the unprocessed face image of the registered player exists in the biological information DB 22. When the unprocessed face image of the registered player exists, the flow returns to the processing in Step S51. That is, the pieces of processing in Steps S51 to S55 are repeated until the degree of similarity is calculated with respect to the face images of all the registered players of the biological information DB 22. The similarity calculation processing is ended when the similarity calculator 232 determines that the unprocessed face image of the registered player does not exist in the biological information DB 22 in Step S55.

Figure 11:
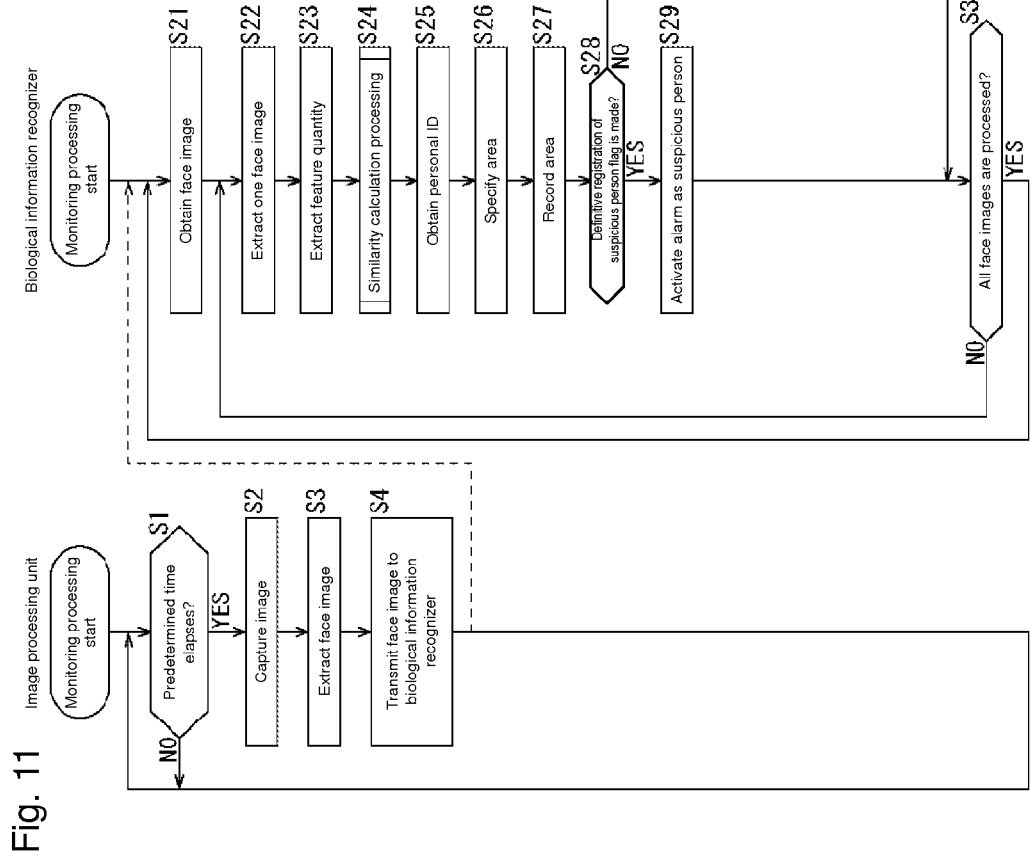
FIG. 11 is a flowchart illustrating monitoring processing performed by the biological information recognizer in FIG. 10.

Here, the description will return to the flowchart in FIG. 11.

In Step S25, the similarity determination unit 233 obtains an order based on the calculation result of the degree of similarity registered in the buffer 233a, and compares the degree of similarity of the top face image registered in the biological information DB 22 to a predetermined threshold. When the degree of similarity of the top face image registered in the biological information DB 22 is higher than the predetermined threshold, the similarity determination unit 233 supplies the information on the degree of similarity of the face image and the personal ID that is of the information identifying the corresponding face image to the suspicious person determination unit 227. The suspicious person determination unit 227 obtains the personal ID corresponding to the captured face image and the information on the degree of similarity. When the degree of similarity is lower than the predetermined threshold, the similarity determination unit 233 determines that the face image is not the face image of the same person, and registers the face image in the unregistered player database (not illustrated). Accordingly, the case that the similar face image exists in the biological information DB 22 will be described below.

Due to the definition of the degree of similarity, the degree of similarity with respect to the face image of the registered player most similar to the captured face image is not limited to the degree of similarity having the highest value. Therefore, sometimes a magnitude relationship between the degree of similarity and the threshold differs from that of this example.

In Step S26, the area specifying unit 229 specifies the area registered in the area table 229a based on the camera ID included in the supplied image, and supplies the information on the image capturing clock time to the area movement history recording unit 228 together with the information on the specified area. For example, as illustrated in FIG. 13, the area in which the image is captured with the camera having the camera ID and the entrance or the exit are registered in the area table while correlated with the camera ID. Accordingly, in FIG. 13, the cameras having the camera IDs 1 to 3 are the entrance cameras 40 in the store. The cameras having the camera IDs 4 to 6 are the exit cameras 42 in the store. The cameras having the camera IDs 7 and 8 are the in-store cameras 41 that are provided in the doorway of the corner in which the amusement machine 36 of the one yen per ball is placed in the store. The cameras having the camera IDs 9 and 10 are the in-store cameras 41 that are provided in the doorway of the corner in which the amusement machine 36 of the four yen per ball is placed in the store. The camera having the camera ID 11 is the in-store camera 41 that is provided in the entrance of the toilet in the store. The cameras having the camera IDs 12 to 15 are cameras 38 that are provided in the amusement machines 36 having the amusement machine numbers 001 to 004.

In Step S27, the suspicious person determination unit 227 supplies the information on the obtained personal ID to the area movement history recording unit 228. The area movement history recording unit 228 additionally registers the information on the area specified by the area specifying unit 229 in the area movement history DB 20 while correlating the information with the personal ID supplied by the suspicious person determination unit 227. For example, as illustrated in FIG. 14, date and time information indicating the image capturing clock time and the information on the area specified by the camera ID are registered in the area movement history DB 20 while correlated with the personal ID identifying the person of the registered face image. For example, in a top line in FIG. 14, the face image of the person identified by the personal ID is captured at 10:00 on Oct. 1, 2010 with the entrance camera 40 in the store, the person starts the game using the amusement machine 36 having the machine number 001 at 10:01 on Oct. 5, 2010 and ends the game at 10:06 on Oct. 5, 2010.

In Step S28, the suspicious person determination unit 227 determines whether the face image is registered as the suspicious person in the biological information DB 22 based on the personal ID. For example, as illustrated in FIG. 15, the face image and the suspicious person flag are the absences of registrations (a blank in FIG. 15), the provisional registrations, or the definitive registrations of the face image and the suspicious person flag in the biological information DB 22 while correlated with the personal ID. The definitive registration of the suspicious person flag means information identifying the person of the face image identified by the personal ID as the suspicious person, and the provisional registration of the suspicious person flag means a state in which the person is not the suspicious person but a candidate. Accordingly, for the personal IDs 1 and 3 in FIG. 15, the person is assumed to be the suspicious person, the processing goes to Step S29.

In Step S29, the suspicious person determination unit 227 activates an alarm by displaying the detection of the suspicious person on the display unit 23, and controls the communication unit 224 to transmit the detection of the suspicious person to the mobile terminal 19 owned by the staff.

In Step S30, the face image obtaining unit 221 determines whether the processing is performed to all the supplied face images. When the unprocessed face image exists, the processing returns to Step S22. That is, the pieces of processing in Steps S22 to S30 are repeated until the processing is performed to all the supplied face images. When the face image obtaining unit 221 determines that the processing is performed to all the face images, the flow returns to the processing in Step S21.

On the other hand, for example, when the definitive registration of the suspicious person flag is not made in Step S28, the processing goes to Step S31.

In Step S31, the suspicious person determination unit 227 accesses the area movement history DB 20 to determine whether the face image being currently captured is the face image captured with the counter camera 43 that captures the image in front of the premium exchange counter 113. That is, even if the suspicious person takes the illegal action, the game ball or the medal is acquired by the illegal action, and it is necessary for the suspicious person to exchange the game ball or the medal to the premium after the counting of the game ball or the medal in order to obtain in-kind dividend or cash the game ball or the medal. Therefore, the suspicious person emerges at the premium exchange counter 113. Whether the person emerges at the premium exchange counter 113 is one of criteria for determining whether the person is the suspicious person. Here, for example, when the face image is captured with the camera except the counter camera 43, the processing goes to Step S36 because a possibility of displaying the suspicious person cannot be determined.

In Step S36, the suspicious person determination unit 227 supplies the information on the supplied personal ID to the suspicious person registration unit 223. The suspicious person registration unit 223 controls the provisional registration determination unit 241 to determine whether the person of the supplied personal ID is the suspicious person. More specifically, the provisional registration determination unit 241 obtains the information on the area that becomes the movement history from the area movement history DB 20 based on the personal ID, and the provisional registration determination unit 241 determines whether the provisional registration of the suspicious person flag is made based on whether the pattern of the area is matched with the pattern of the pattern table 241a in which the behavioral pattern (an area movement pattern obtained by the behavior of the suspicious person) of the suspicious person is stored. FIG. 16 illustrates an example of the pattern table 241a. From the left in FIG. 16, the pieces of information of the pattern, the threshold, and the number of times are registered while correlated with the pattern ID. Specifically, for example, for the pattern ID 1, that the provisional registration of the suspicious person flag is made is determined when the person repeats the entrance and exit of the store at least three times per hour. Similarly, for the pattern ID 2, that the provisional registration of the suspicious person flag is made is determined when the person repeats the entrance and exit of the store at least ten times per day. Similarly, for the pattern ID 3, that the provisional registration of the suspicious person flag is made is determined when the person repeats the entrance and exit of the toilet at least five times per hour.

In Step S36, for example, as illustrated in parts A to C of the area movement history DB 20 in FIG. 14, because the person of the personal ID 1 has the record of three-time entrance and exit of the amusement shop, the person is matched with the pattern of the pattern ID 1, the provisional registration of the suspicious person flag is assumed to be made, and the processing goes to Step S37.

In Step S37, the provisional registration determination unit 241 supplies the determination result that the provisional registration should be made to the provisional registration unit 242, and the provisional registration determination unit 241 issues an instruction to the provisional registration unit 242 to make the provisional registration. The provisional registration unit 242 accesses the biological information DB 22, and the provisional registration unit 242 registers the suspicious person flag while correlating the suspicious person flag with the personal ID as illustrated by, for example, the personal ID 2 or 5 in FIG. 15.

For example, when the provisional registration of the suspicious person flag is assumed not to be made in Step S36, the processing goes to Step S30.

When the determination that the image is captured with the counter camera 43 at the premium exchange counter 113 is made in Step S31, the processing goes to Step S32.

In Step S32, the suspicious person determination unit 227 supplies the information on the supplied personal ID to the suspicious person registration unit 223. The suspicious person registration unit 223 controls the definitive registration determination unit 243 to determine whether the provisional registration of the suspicious person flag is made for the person of the supplied personal ID. More specifically, the definitive registration determination unit 243 accesses the biological information DB 22 based on the personal ID, and determines whether the provisional registration of the suspicious person flag is made. For example, when the provisional registration is made in Step S32, the processing goes to Step S33.

In Step S33, the definitive registration determination unit 243 accesses the area movement history DB 20 based on the personal ID to specify which amusement machine the person plays the game with, and the definitive registration determination unit 243 makes an inquiry to the amusement shop management device 24 about specified amusement machine to obtain information on an exchange rate of the corresponding amusement machine and pieces of game information, such as the number of game balls acquired in the game by the player identified by the personal ID. As used herein, the information on the exchange rate of the amusement machine means information indicating the amusement machine in the one-yen corner of one yen per ball or the amusement machine in the four-yen corner of four yen per ball, and the pieces of game information, such as the number of acquired game balls means information on the number of game balls paid by the amusement machine 36 with which the person of the personal ID plays the game. As to each piece of information, the amusement machine 36 and the game time can be specified by accessing the area movement history DB 20 based on the pieces of information on the area and the image capturing clock time with the camera 38, which captures the image of the person identified by the personal ID and is placed in the amusement machine 36. Therefore, the identified amusement machine 36 and the game time can be obtained by making the inquiry to the amusement shop management information 24.

In Step S34, the definitive registration determination unit 243 determines whether the definitive registration of the suspicious person flag should be made based on whether the game information and the behavioral pattern from the amusement shop management device 24 are matched with those recorded in the pattern table 243a. As used herein, for example, the pattern table 243a is a table in FIG. 17. For example, for the pattern ID 1, a staying time at the four-yen corner does not exist, but the exchange rate information is four yen, thereby making the definitive registration of the suspicious person flag. For the pattern ID 2, the staying time at the four-yen corner is less than 10 minutes, and the exchange rate information is four yen while the number of acquired game balls is greater than or equal to 10000, thereby making the definitive registration of the suspicious person flag. The exchange rate can be recognized by the record of the image captured by the in-store camera 41-d in the counting machine 35 for one yen per ball or the in-store camera 41-c in the counting machine 35 for four yen per ball.

When the definitive registration of the suspicious person flag should be made in Step S34, the definitive registration determination unit 243 notifies the definitive registration unit 244 that the definitive registration should be made and issues the instruction to the definitive registration unit 244 to make the definitive registration in Step S35. The definitive registration unit 244 accesses the biological information DB 22 to make the definitive registration of the suspicious person flag of the corresponding personal ID.

When the provisional registration is not made in Step S32, or when behavioral pattern is not the pattern in which the definitive registration of the suspicious person flag should be made in Step S34, the processing goes to Step S30.

Through the above pieces of processing, the suspicious person flag can be added to the player who is assumed to take the illegal action in a stepwise manner based on the area movement history of the area movement history DB 20. Particularly, in making the definitive registration of the suspicious person flag, the illegal action is completed by exchanging the amusement medium to the premium at the premium exchange counter 113, and a damage is generated on the amusement shop side. Therefore, the definitive registration is made by the completion of the illegal action. Even if the illegal action is confirmed, as long as the area pattern is matched with the behavioral pattern of the suspicious person while the amusement medium is exchanged to the premium, the suspicious person flag is not immediately changed to the definitive registration but remains in the provisional registration. Therefore, even if the area pattern assumed to be the illegal action is incidentally detected to make the provisional registration of the suspicious person flag, the definitive registration is not made unless the face image is captured at the premium exchange counter while the game ball is illegally acquired, so that a risk of making the definitive registration of the suspicious person flag for the person who does not actually take the illegal action can be decreased.

The provisional registration of the suspicious person flag is also considered that, because the person does not take the illegal action, the person is not the suspicious person when the suspicious person flag remains in the provisional registration for a predetermined period. When the predetermined period elapses while the suspicious person flag remains in the provisional registration, the provisional registration of the suspicious person flag may be cancelled. For example, the information in which the provisional registration is made may be cancelled at a time point when business is closed. In the above description, the definitive registration of the suspicious person flag is made when the area pattern is matched with the behavioral pattern of the suspicious person while the image is captured at the premium exchange counter 113. Alternatively, in order to simplify the processing to easily make the definitive registration of the suspicious person flag, the determination is not made by the behavioral pattern, but the definitive registration of the suspicious person flag may be made simply by capturing the image of the person for which the provisional registration is made at the premium exchange counter 113. However, in this case, because there is a risk of including the player who should not be basically registered as the suspicious person, it is necessary to promote awareness when the suspicious person is detected.

When the person is detected by the face image after the definitive registration is made as the suspicious person, the alarm is quickly activated on the visit of the suspicious person. Therefore, the registration of the suspicious person and the alarm activation of the visit of the suspicious person can easily and properly be managed.

[Face Image Management Processing]

Figure 18:
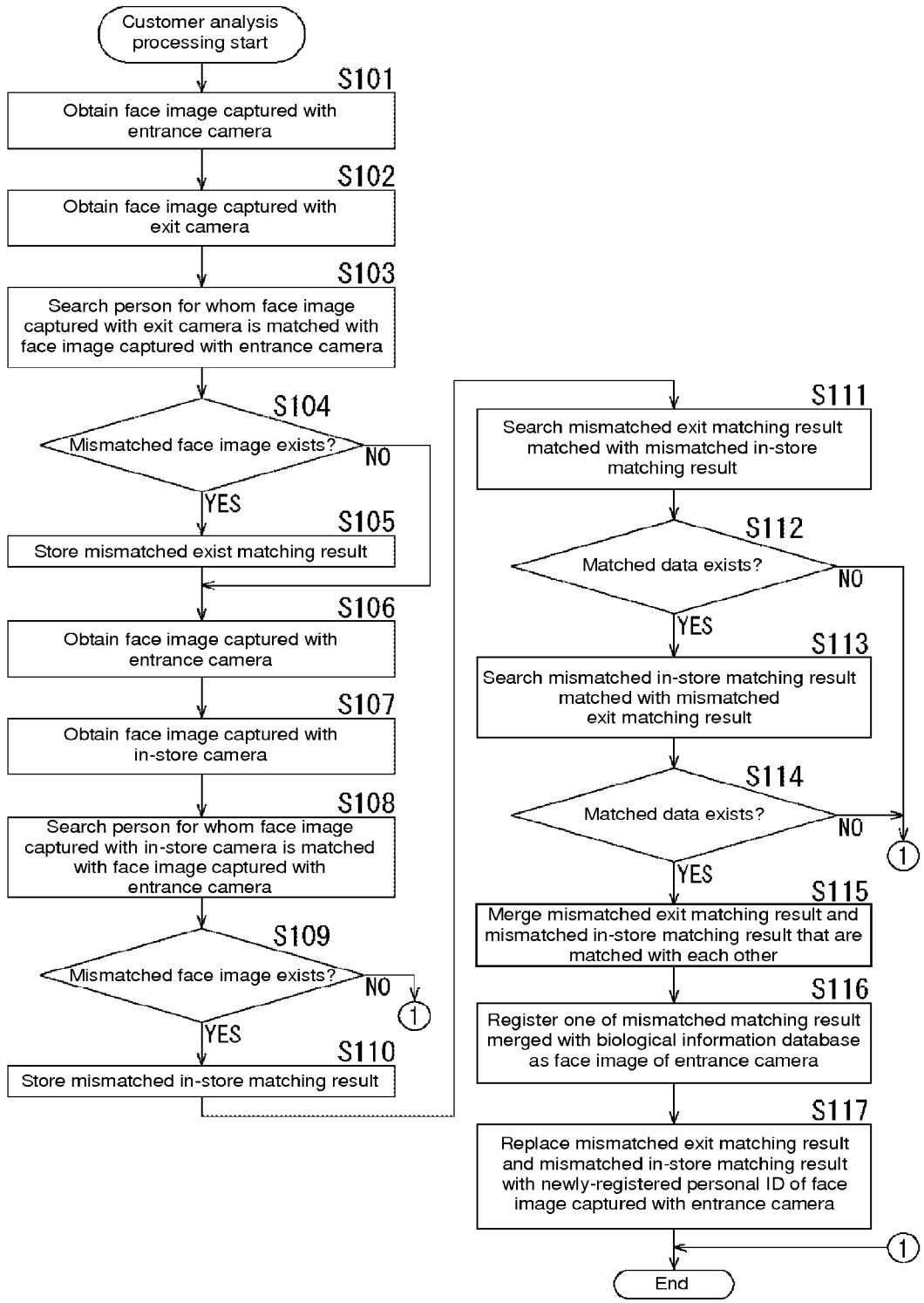
FIG. 18 is a flowchart illustrating face image management processing.

Face image management processing will be described below with reference to a flowchart in FIG. 18. It is assumed that the face image management processing is performed after the close of business. Alternatively, the face image management processing may be performed during business hours.

In Step S101, the entrance and exit matching unit 261 accesses the area movement history DB 20 to search the personal ID of the face image captured with the entrance camera 40. For example, the personal ID that is classified into "enter store" as the area is searched in the area movement history DB 20 in FIG. 14.

In Step S102, the entrance and exit matching unit 261 accesses the area movement history DB 20 to search the personal ID of the face image captured with the exit camera 42. That is, the personal ID that is classified into "exit from store" as the area is searched in the area movement history DB 20 in FIG. 14.

In Step S103, the entrance and exit matching unit 261 matches the face image of the searched personal ID among the face images captured with the exit camera 42 against the face image of the searched personal ID in the face images captured with the entrance camera 40, and searches the face image captured with the exit camera 42, which is not matched with the face image captured with the entrance camera 40. The face image matching is performed through the same processing in the matching unit 222, and the description of the processing is omitted.

In Step S104, the entrance and exit matching unit 261 determines whether the mismatched face image exists as a result of the search. When the mismatched face image exists, the entrance and exit matching unit 261 stores the personal ID of the face image captured with the mismatched exit camera 42 as a mismatched exit matching result in Step S105. On the other hand, when no mismatched face image exists, the processing in Step S105 is skipped.

In Step S106, the entrance and in-store matching unit 262 accesses the area movement history DB 20 to search the personal ID of the face image captured with the entrance camera 40. For example, the personal ID that is classified into "enter store" as the area is searched in the area movement history DB 20 in FIG. 14.

In Step S107, the entrance and in-store matching unit 262 accesses the area movement history DB 20 to search the personal ID of the face image captured with the in-store camera 41. For example, the personal ID that is classified into "enter one-yen corner", "starts game with amusement machine having machine number 001", and "ends game with amusement machine having machine number 001" as the area is searched in the area movement history DB 20 in FIG. 14.

In Step S108, the entrance and in-store matching unit 262 matches the face image of the searched personal ID among the face images captured with the in-store camera 41 against the face image of the searched personal ID in the face images captured with the entrance camera 40, and searches the face image captured with the in-store camera 41, which is not matched with the face image captured with the entrance camera 40. The face image matching is performed through the same processing as the matching unit 222, and the description of the processing is omitted.

In Step S109, the entrance and in-store matching unit 262 determines whether the mismatched face image exists as a result of the search. When the mismatched face image exists, the entrance and in-store matching unit 262 stores the personal ID of the face image captured with the mismatched in-store camera 41 as a mismatched in-store matching result in Step S110. On the other hand, when no mismatched face image exists, the processing in Step S110 is skipped.

In Step S111, among the face images of the personal IDs that become the mismatched exit matching result, the exit and in-store matching unit 263 searches the face image matched with the face image of the personal ID of the mismatched in-store matching result by the matching. In Step S112, the exit and in-store matching unit 263 determines whether the face image of the personal ID that becomes the mismatched exit matching result is matched with the face image of the personal ID of the mismatched in-store matching result. When the face image of the personal ID that becomes the mismatched exit matching result is matched with the face image of the personal ID of the mismatched in-store matching result in Step S112, the processing goes to Step S113. When the face image of the personal ID that becomes the mismatched exit matching result is not matched with the face image of the personal ID of the mismatched in-store matching result in Step S112, the processing ends.

In Step S113, among the face images of the personal IDs that become the mismatched in-store matching result, the exit and in-store matching unit 263 searches the face image matched with the face image of the personal ID of the mismatched exit matching result by the matching. In Step S114, the exit and in-store matching unit 263 determines whether the face image of the personal ID that becomes the mismatched in-store matching result is matched with the face image of the personal ID of the mismatched exit matching result. When the face image of the personal ID that becomes the mismatched in-store matching result is matched with the face image of the personal ID of the mismatched exit matching result in Step S114, the processing goes to Step S115. When the face image of the personal ID that becomes the mismatched in-store matching result is not matched with the face image of the personal ID of the mismatched exit matching result in Step S114, the processing ends. The face image matching performed in Steps S111 and S113 is similar to that performed by the matching unit 222, the description thereof is omitted.

In Step S115, the entrance information registration unit 264 merges (unites) the mismatched in-store matching result and the mismatched exit matching result.

In Step S116, the entrance information registration unit 264 accesses the area movement history DB 20 to search the personal ID of the face image having the earliest image capturing clock time and the personal ID of the face image having the image capturing clock time closest to that of the face image captured with the entrance camera 40 among the pieces of face image information in which the mismatched in-store matching result and the mismatched exit matching result are merged. The entrance information registration unit 264 accesses the biological information DB 22, and the entrance information registration unit 264 registers the face image information, which is registered while correlated with the searched personal ID, while replacing the face image information with one of the face images in each of which the mismatched in-store matching result and the mismatched exit matching result are merged.

In Step S117, the entrance information registration unit 264 replaces the personal ID of the face image, in which the mismatched in-store matching result and the mismatched exit matching result are merged, with the personal ID of the face image having the earliest image capturing clock time and the personal ID of the face image having the image capturing clock time closest to that of the face image captured with the entrance camera 40 among the face images in each of which the mismatched in-store matching result and the mismatched exit matching result are merged.

The above processing is described as follows.

Figure 19:
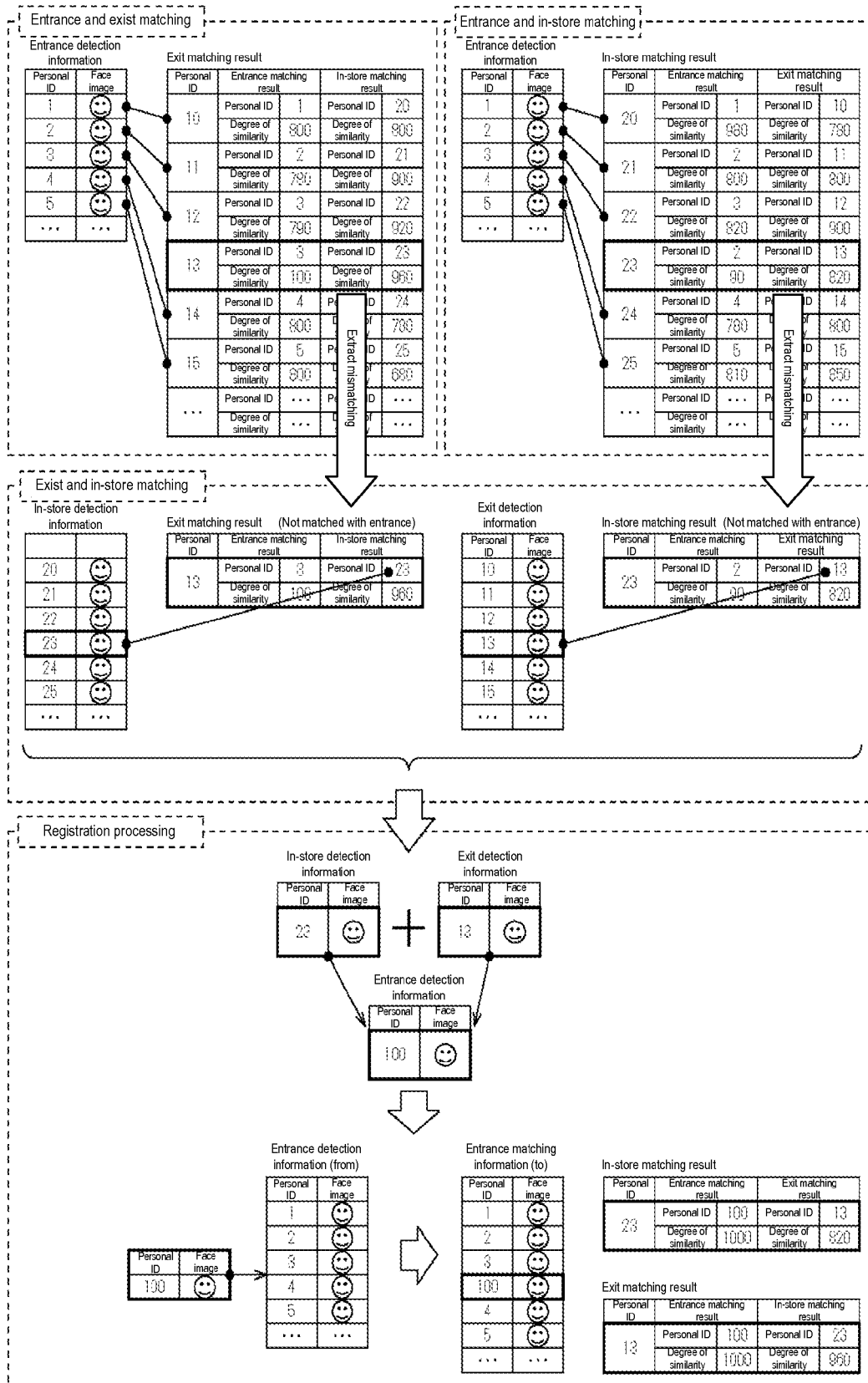
FIG. 19 is a view illustrating the face image management processing.

As illustrated by "entrance and exit matching" in an upper left portion in FIG. 19, the face images of the personal IDs 1 to 5 illustrated by "entrance detection information" can be correctly recognized among the face images captured with the entrance camera 40. In such cases, the degree of similarity between each of the face images of the personal IDs 10 to 15 captured with the exit camera 42 and the face images corresponding to the persons captured with the entrance camera 40 and the in-store camera 41 is obtained, and the personal ID having the top degree of similarity is displayed in FIG. 19 as "exit matching result" together with the degree of similarity. At this point, on the left in "exit matching result", the personal IDs of the face images having the top degrees of similarity to all the face images captured with the entrance camera 40 are registered as "entrance matching result" together with the degrees of similarity while correlated with the personal IDs of the face images captured with the exit camera 42. On the right in "exit matching result", the personal IDs of the face images having the top degrees of similarity to all the face images captured with the in-store camera 41 are registered as "in-store matching result" together with the degrees of similarity while correlated with the personal IDs of the face images captured with the exit camera 42. For example, for the personal ID 10 of the face image captured with exit camera 42, the face image has the highest degree of similarity to the face image of the personal ID 1 among the face images captured with the entrance camera 40, and the degree of similarity is 800. For the personal ID 10 of the face image captured with exit camera 42, the face image has the highest degree of similarity to the face image of the personal ID 20 in the face images captured with the in-store camera 41, and the degree of similarity is 800. In this case, the degree of similarity is expressed in the range of 0 to 1000, and the degree of similarity increases with increasing numerical value.

For example, it is assumed that the person of the face image, which has the personal ID 13 and is captured with the exit camera 42, is unclearly captured with the entrance camera 40 due to the backlight or the overexposure. In such cases, the face image, which has the personal ID 13 and is captured with the exit camera 42, has the highest degree of similarity to the face image, which has the personal ID 3 and is captured with the entrance camera 40. However, the degree of similarity is about around 100 in which the face images cannot be recognized to be similar to each other. Therefore, because the face image, which is captured with the exit camera 42 and has the personal ID 13, is the face image unclearly captured with the entrance camera 40, the face image, which is captured with the exit camera 42 and has the personal ID 13, is dealt with as the face image that is not matched with any face images captured with exit camera 42 through the processing in Steps S101 to S105. Therefore, the face image, which is captured with the exit camera 42 and has the personal ID 13, is extracted as the mismatched exit matching result as surrounded by a thick-line frame.

Similarly, as illustrated in "entrance and in-store matching" in an upper right portion of FIG. 19, for example, it is assumed that the person of the face image, which has the personal ID 23 and is captured with the in-store camera 41, is unclearly captured with the entrance camera 40 due to the backlight or the overexposure. In such cases, the face image, which has the personal ID 23 and is captured with the in-store camera 41, has the highest degree of similarity to the face image, which has the personal ID 2 and is captured with the entrance camera 40. However, the degree of similarity is about around 90 in which the face images cannot be recognized to be similar to each other. Therefore, because the face image, which is captured with the in-store camera 41 and has the personal ID 23, is the face image unclearly captured with the entrance camera 40, the face image, which is captured with the in-store camera 41 and has the personal ID 23, is dealt with as the face image that is not matched with any face images captured with entrance camera 40 through the pieces of processing in Steps S106 to S110. Therefore, the face image, which is captured with the in-store camera 41 and has the personal ID 23, is extracted as the mismatched in-store matching result as surrounded by a thick-line frame.

As illustrated in "exit and in-store matching" in a second line from the top of FIG. 19, using the mismatched exit matching result and the mismatched in-store matching result that are extracted as described above, the personal IDs 13 and 23 illustrated as "in-store detection information" and "exit detection information" are extracted as the personal IDs when the face images are captured with the in-store camera 41 and the exit camera 42

The face image that becomes the mismatched in-store matching result and the face image that becomes the mismatched exit matching result are matched against each other through the pieces of processing in Steps S111 to S114. When the face image that becomes the mismatched in-store matching result and the face image that becomes the mismatched exit matching result are matched with each other, as illustrated in "exit and in-store matching" of FIG. 19, the face images managed by the personal IDs 13 and 23 are merged through the processing in Step S115 to generate the face image, which is captured with the new entrance camera 40 and has the personal ID 100. At this point, based on the mismatched exit matching result, the degree of similarity between the face image, which is captured with the exit camera 42 and has the personal ID 13, and the face image, which is captured with the in-store camera 41 and has the personal ID 23, becomes 960, and the face images can be assumed to be matched with each other. On the other hand, based on the mismatched in-store matching result, the degree of similarity between the face image, which is captured with the in-store camera 41 and has the personal ID 23, and the face image, which is captured with the exit camera 42 and has the personal ID 13, becomes 820, and the face images can be assumed to be matched with each other. The pieces of processing in Steps S111 and S112 and the pieces of processing in Steps S113 and S114 are aimed at the matching between the face image that becomes the mismatched in-store matching result and the face image that becomes the mismatched exit matching result, and no problem is generated by performing either the pieces of processing in Steps S111 and S112 or the pieces of processing in Steps S113 and S114. In this case, the pieces of processing in Steps S111 and S112 and the pieces of processing in Steps S113 and S114 are performed twice in order to improve reliability.

The face images, which are obtained through the above pieces of processing and managed by the personal IDs 13 and 23, are unclearly captured with the entrance camera 40. Therefore, the face images captured with the in-store camera 41 and the exit camera 42 exist while the face image captured with the corresponding entrance camera 40 does not exist.

Among the face images managed by the personal IDs 13 and 23, because of the unclear face image, which is captured with the entrance camera 40 at the clock time closest to the clock time at which the face image is initially captured, there is a high probability that the face image is not captured with the in-store camera 41 or the exit camera 42. Therefore, among the face images managed by the personal IDs 13 and 23, one of the face images managed by the personal IDs 13 and 23 is registered as the face image, which is captured with the entrance camera 40 and has the personal ID, for example, 100, in the biological information DB 22 at the clock time closest to the clock time at which the face image is initially captured through the processing in Step S116.

As illustrated in the lowest portion of FIG. 19, the face image that cannot be clearly captured at first with the entrance camera 40 can be managed while replaced with the clear image captured with the in-store camera 41 or the exit camera 42 through the processing in Step S116. In this case, for example, as illustrated in a lower right portion of FIG. 19, the face image, which is captured with the entrance camera 40 and managed by the personal ID 100, is registered as the face image, which is captured with the entrance camera 40 and has the personal ID 3 or 4 at the clock time close to the clock time at which the face images of the personal IDs 13 and 23 are captured. The face image managed by the personal ID 100 is registered as the face image that has the degree of similarity of 1000 to the face image, which is captured with the in-store camera 41 and has the personal ID 23, namely, as the face image completely matched with the face image, which is captured with the in-store camera 41 and has the personal ID 23. Similarly, the face image managed by the personal ID 100 is registered as the face image that has the degree of similarity of 1000 to the face image, which is captured with the exit camera 42 and has the personal ID 13, namely, as the face image completely matched with the face image, which is captured with the exit camera 42 and has the personal ID 13.

The personal ID is replaced through the processing in Step S117 such that the face images captured with the in-store camera 41 and the exit camera 42 are managed while correlated with the personal ID of the biological information DB 22, which is replaced with the clear face image. Therefore, the information managed by the face image in the store can be commonly managed by the face image captured with the entrance camera 40 and the personal ID of the face image. As a result, for example, the management information on each player in the store can commonly be managed by the personal ID, which is added when the person is captured with the entrance camera 40.

Second Embodiment

Configuration Example of Monitoring System of Second Embodiment

In the first embodiment, by way of example, the definitive registration of the suspicious person flag is made, when the counter camera 43 at the premium exchange counter 113 captures the person for whom the provisional registration of the suspicious person flag is made, and when the person takes the predetermined behavioral pattern. In registering the suspicious person flag, sometimes it is necessary to make the definitive registration of the suspicious person flag by other things except the behavioral pattern. The staff is notified of the necessity to make the definitive registration, and the definitive registration may be made in the judgment of the staff.

Figure 20:
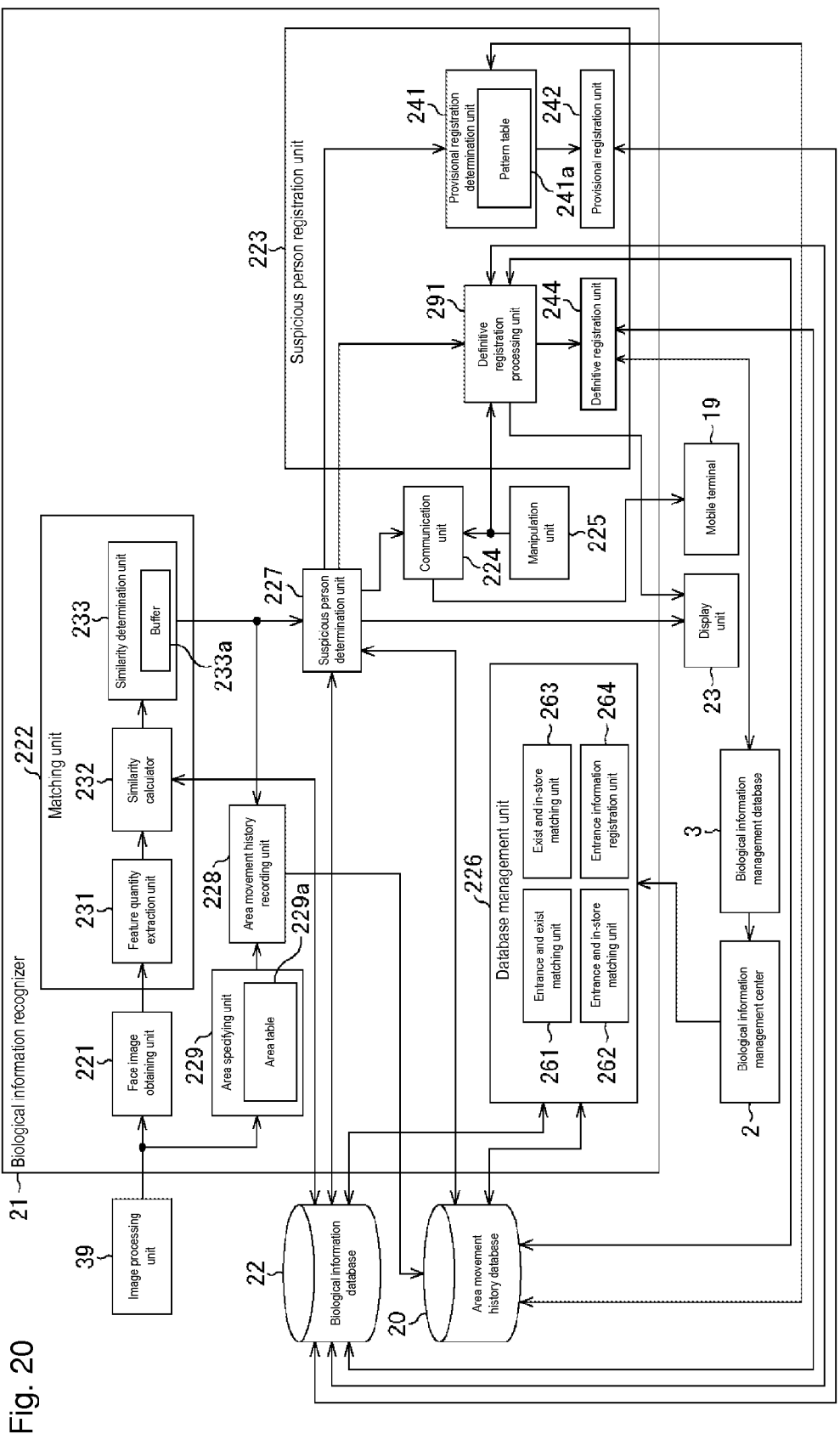
FIG. 20 is a view illustrating a configuration example of a biological information recognizer according to a second embodiment.

FIG. 20 illustrates a configuration example of the biological information recognizer 21. In the biological information recognizer 21, when the person for whom the provisional registration of the suspicious person flag is made and which is captured with the counter camera 43 at the premium exchange counter 113 is the predetermined behavioral pattern, the staff is notified of the necessity to make the definitive registration and the definitive registration can be made in the judgment of the staff. In the biological information recognizer 21 in FIG. 20, the configuration including the same function as the biological information recognizer 21 in FIG. 10 is designated by the same name and symbol, and the description is appropriately omitted.

The biological information recognizer 21 in FIG. 20 differs from the biological information recognizer 21 in FIG. 10 in that a definitive registration processing unit 291 is provided instead of the definitive registration determination unit 243. When being notified of the face image, which is captured with the counter camera 43 and in which the provisional registration of the suspicious person flag is made, the definitive registration processing unit 291 accesses the area movement history DB 20 and the biological information DB 22, and reads a movement history of the area where the face image is captured. The area movement history is registered while correlated with the personal ID identifying the face image. Then the definitive registration processing unit 291 generates a display image including information encouraging the staff to determine whether the definitive registration of the suspicious person flag is made, and display the display image on the display unit 23. The definitive registration processing unit 291 makes the definitive registration of the suspicious person flag in the biological information DB 22 based on a manipulation signal that is generated by the manipulation unit 225 in response to the manipulation of the staff.

[Monitoring Processing Performed by Biological Information Recognizer 21 in FIG. 20]

Figure 21:
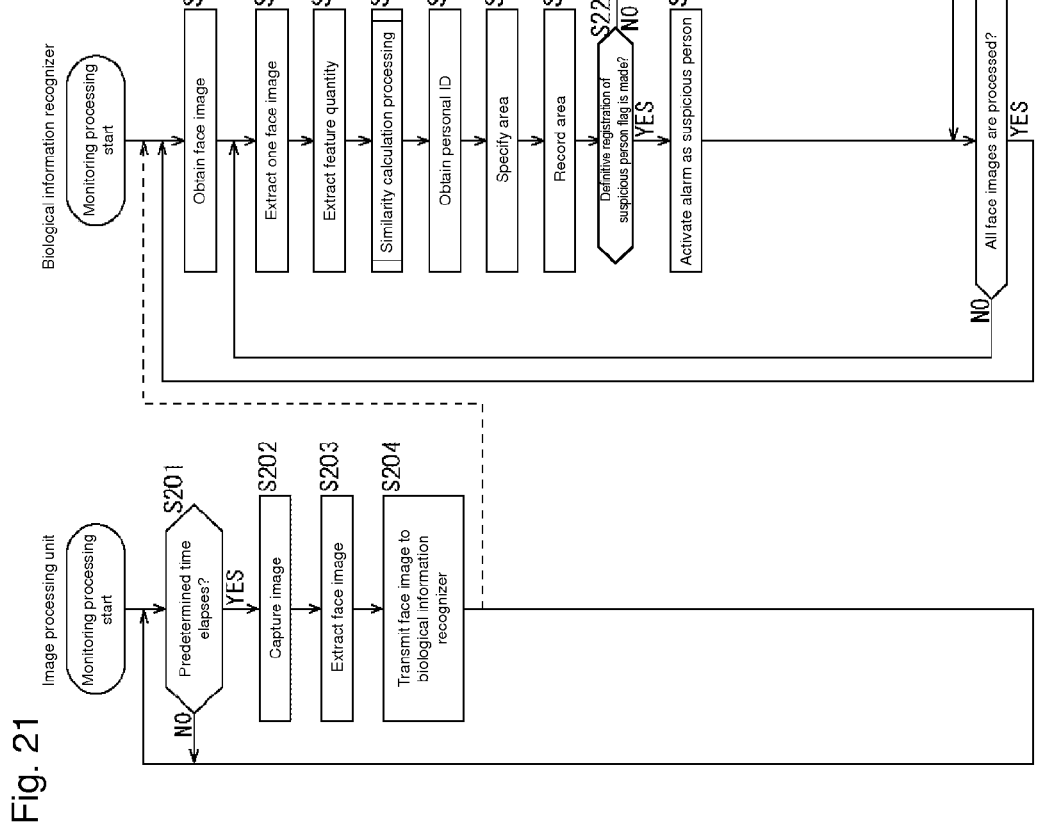
FIG. 21 is a flowchart illustrating monitoring processing performed by the biological information recognizer in FIG. 20.

Monitoring processing performed by the biological information recognizer 21 in FIG. 20 will be described below with reference to a flowchart in FIG. 21. The pieces of processing in Steps S201 to S204 and Steps S221 to S232, S236, and S237 in FIG. 21 are similar to those in Steps S1 to S4 and Steps S21 to S32, S36, and S37 in FIG. 11, the description is omitted.

Figure 22:
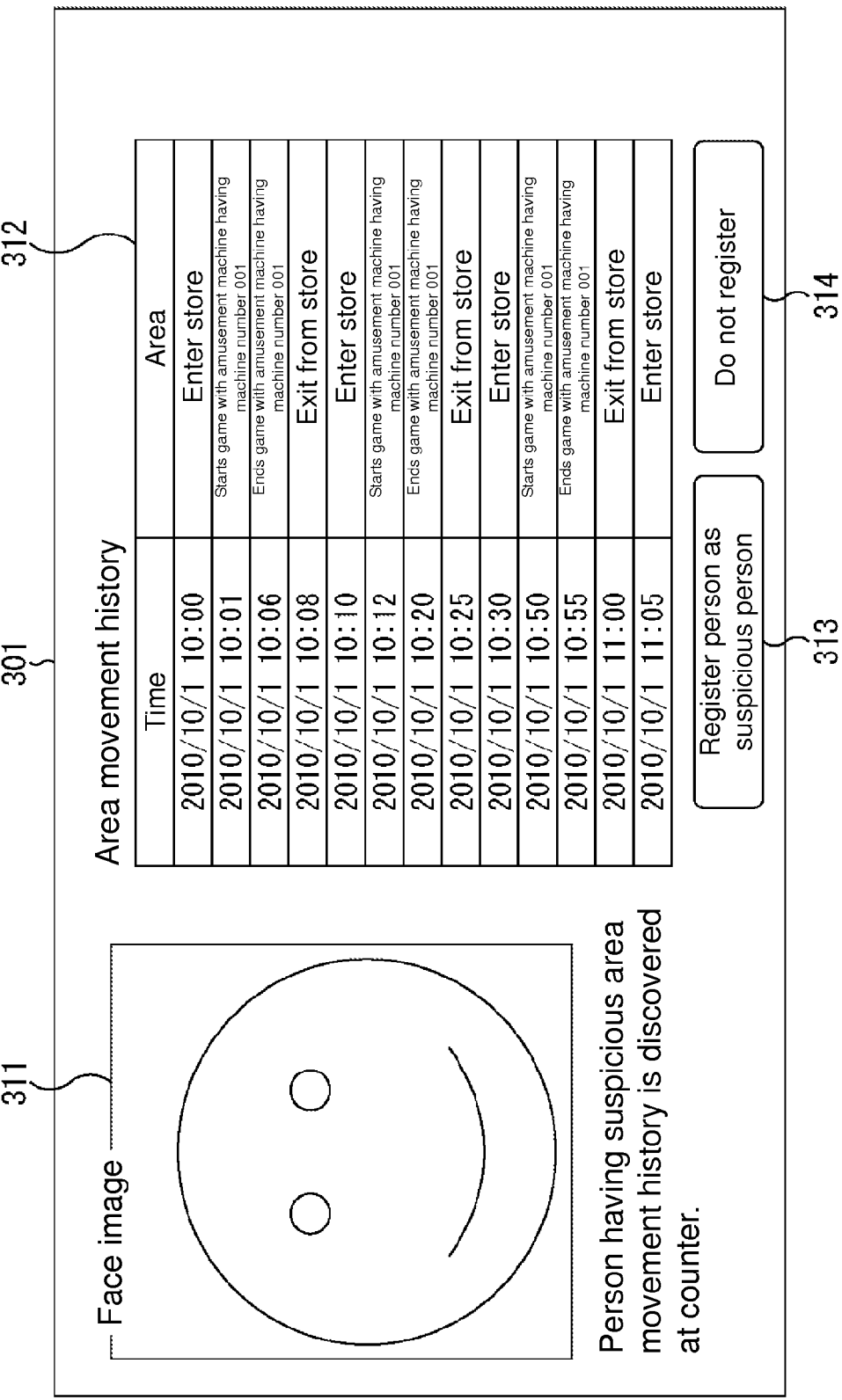
FIG. 22 is a view illustrating suspicious person registration processing in the monitoring processing performed by the biological information recognizer in FIG. 20.

When the provisional registration is made in Step S232, the definitive registration processing unit 291 is notified of the face image that becomes the matching result in Step S233, the definitive registration processing unit 291 accesses the area movement history DB 20 reads the movement history of the area where the face image is captured. The area movement history is registered while correlated with the personal ID identifying the face image. Then the definitive registration processing unit 291 generates a display image 301 in FIG. 22 that encourages the staff to determine whether the definitive registration is made, and display the display image 301 on the display unit 23. FIG. 22 illustrates a display example of the display image 301. A face image display field 311 is provided in the left portion, and the face image, which is registered in the biological information DB 22 while correlated with the personal ID in which the provisional registration of the suspicious person flag is made, is displayed in the face image display field 311. An area movement history field 312 is provided on the right of the face image display field 311, and the area movement history, which is registered in the area movement history DB 20 while correlated with the personal ID in which the provisional registration of the suspicious person flag is made, is displayed in the area movement history field 312. A button 313 on which "register person as suspicious person" is written and a button 314 on which "do not register" is written are provided below the area movement history field 312. The button 313 is pressed when the staff manipulates the suspicious person flag of the person displayed on the display image 301 from the provisional registration to the definitive registration, and the button 314 is pressed when the staff does not make the definitive registration of the suspicious person flag.

In Step S234, the definitive registration processing unit 291 determines whether the manipulation unit 225 is manipulated to issue the instruction to make the definitive registration of the suspicious person flag. For example, when the button 313 in FIG. 22 is pressed to issue the instruction of the definitive registration in Step S234, the definitive registration processing unit 291 notifies the definitive registration unit 244 that the instruction to make the definitive registration of the suspicious person flag is issued in Step S235. In response to the notification, the definitive registration unit 244 accesses the biological information DB 22 to set the suspicious person flag to the definitive registration.

On the other hand, for example, when the button 314 is pressed to determine that the definitive registration of the suspicious person flag is not made in Step S234, the processing in Step S235 is skipped.

When the face image of the person in which the provisional registration of the suspicious person flag is made is captured with the counter camera 43 near the premium exchange counter 113, the image making an inquiry to determine whether the definitive registration of the suspicious person flag is made to the staff is displayed together with the area movement history of the person through the above pieces of processing. The definitive registration of the suspicious person flag can be made when the staff issues the instruction to make the definitive registration in response to the inquiry. As a result, the definitive registration of the suspicious person flag can be made after the staff properly makes the determination while seeing the area movement history.

In the above description, by way of example, the face image unclearly captured with the entrance camera 40 is reregistered by the face images captured with the in-store camera 41 and the exit camera 42. Alternatively, other camera images except the face images captured with the in-store camera 41 and the exit camera 42 may be used. For example, the image of the camera 38 placed in the amusement machine 36 may be used. The unclear face image captured with the camera except the entrance camera 40 may be reregistered using the face image clearly captured with another camera.

As described above, the visit of the player can be properly managed and the illegal action of the suspicious person can properly be monitored such that the registered face image can properly be managed while the face image of the person to be registered is correctly registered.

The above sequence of pieces of monitoring processing can be performed by either hardware or software. In the case where the sequence of pieces of processing is performed by the software, a program constituting the software is installed from a recording medium to a computer incorporated in dedicated hardware or a general-purpose personal computer in which various functions can be performed by installing various programs.

Figure 23:
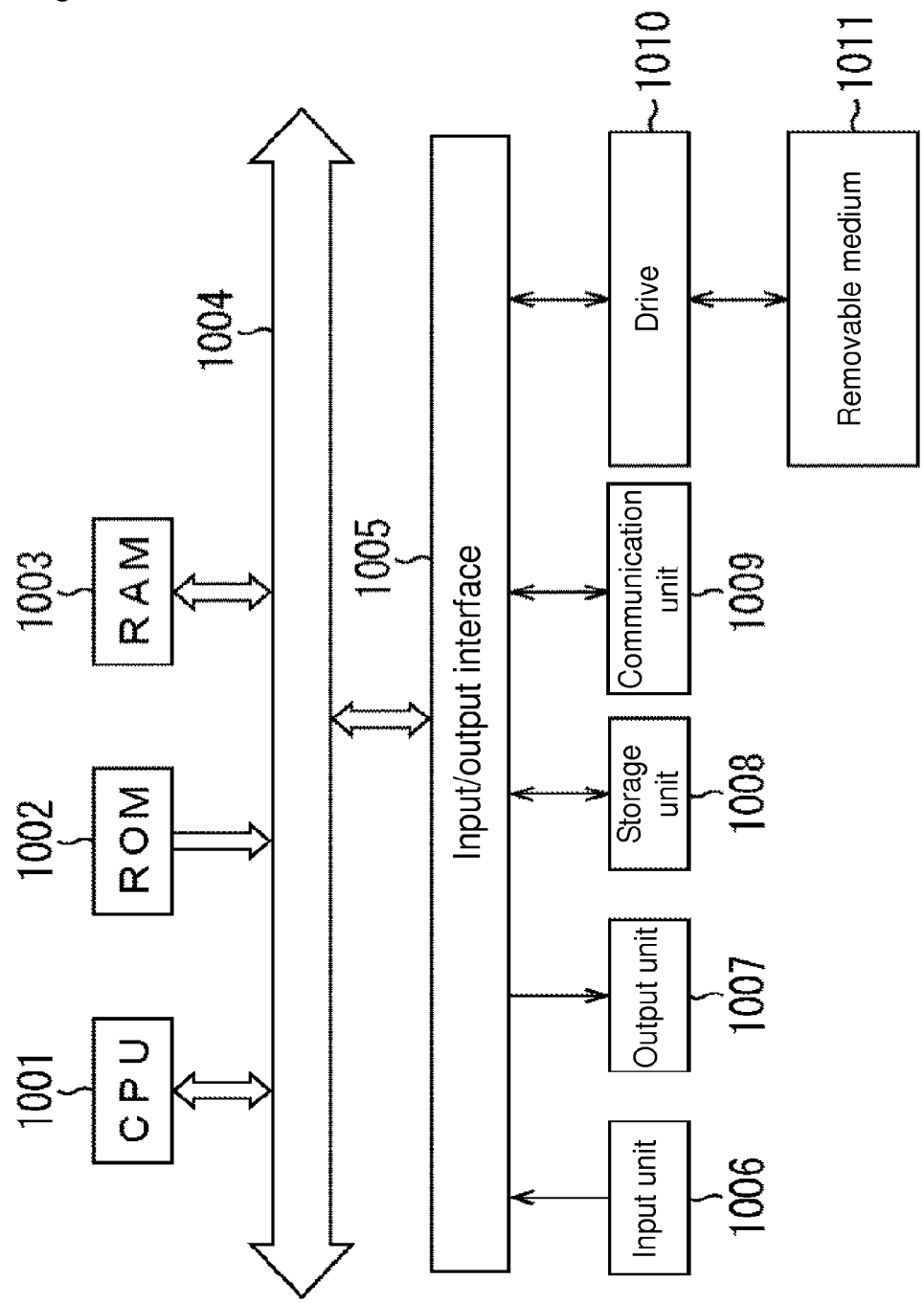
FIG. 23 is a view illustrating a configuration example of a personal computer.

FIG. 23 illustrates a configuration example of the general-purpose personal computer. The personal computer is provided with a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006, an output unit 1007, a storage unit 1008, and a communication unit 1009 are connected to the input/output interface 1005. The input unit 1006 includes input devices, such as the keyboard and the mouse, through which the user inputs an operating command. The output unit 1007 outputs the image of a processing operating screen or a processing result to the display device. The storage unit 1008 includes a hard disk drive in which the program and various pieces of data are stored. The communication unit 1009 includes a LAN (Local Area Network) adapter to perform communication processing through the network typified by the Internet. A drive 1010 is connected to the input/output interface 1005. The drive 1010 reads and writes the data from and in removable mediums 1011, such as a magnetic disk (including a flexible disk), an optical disk (including a CD-ROM (Compact Disc-Read Only Memory) and a DVD (Digital Versatile Disc)), a magneto-optical disk (including a MD (Mini Disc)), and a semiconductor memory.

The CPU 1001 performs various pieces of processing according to the program stored in the ROM 1002 or the program, which is read from the removable mediums 1011, such as the magnetic disk, the optical disk, the magneto-optical disk, and the semiconductor memory, installed in the storage unit 1008, and loaded from the storage unit 1008 to the RAM 1003. The data necessary for the CPU 1001 to perform various pieces of processing are properly stored in the RAM 1003. The removable mediums 1011 can be any form of tangible, non-transitory computer-readable medium.

In the present description, the step that describes the program recorded in the recording medium includes not only the processing that is performed in time series in the described order but also the processing that is not necessarily performed in time series but concurrently or individually performed.

In the present description, the system means the whole apparatus including a plurality of apparatuses.

DESCRIPTION OF SYMBOLS 1, 1-1 to 1-$n$ Amusement shop
2 Biological information management center
3 Biological information management database
4 Third-party amusement shop management center
5 Third-party amusement shop management database
6 Biological information management bus
7 Third-party amusement shop management bus
8, 9 Public communication line network
21 Biological information recognizer
22 Biological information database
24 Amusement shop management device
26 Amusement machine management database
27 Medium lending management device
29 Medium lending management database
30 Amusement shop management information bus
31 Biological information bus
33 Adjustment/vending machine
34 Lending machine
35, 35-1, 35-2 Counting machine 36, 36-1 to 36-*m* Amusement machine
37, 37-1 to 37-*m* Amusement machine peripheral terminal
38, 38-1 to 38-*m* Camera
39, 39-1 to 39-(*m*+*p*+*q*+*r*+1) Image processing unit
40, 40-1 to 40-*p* Entrance camera
41, 41-1 to 41-*q* In-store camera
42, 42-1 to 42-*r* Exit camera
43 Counter camera

The invention claimed is:

1. A monitoring apparatus comprising:
a plurality of cameras configured to capture a face image of a matching target person;
a face image storage configured to accumulate the face image of an accumulator in an accumulator database;
area storage configured to store an area where the face image is captured with respect to each of the plurality of cameras; and
a processing unit configured to operate as:
an area specifying unit configured to specify the area where the face image of the matching target person is captured by the plurality of cameras based on information stored in the area storage;
a matcher configured to perform matching by calculating a degree of similarity between the face image of the matching target person and the face image of the accumulator stored in the accumulator database; and
a matching determination unit configured to determine whether the face image of the matching target person is matched with the face image registered in the accumulator database by comparing the degree of similarity, which is of a matching result of the matcher, to a predetermined threshold;
the monitoring apparatus further comprising:
area history storage configured to store the area specified by the area specifying unit in an area history database while correlating the area with identification information identifying the face image of the accumulator when the face image of the matching target person is matched with the face image registered in the accumulator database;
wherein the processing unit is further configured to operate as:
a provisional registration unit configured to make a provisional registration of a predetermined flag while correlating the predetermined flag with the face image corresponding to the identification information in the accumulator database when a pattern of the area, which is stored in the area history database while correlated with the identification information of the face image, is a predetermined area pattern; and
a definitive registration unit configured to make a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area.

2. The monitoring apparatus according to claim 1, wherein the predetermined flag is a flag indicating a suspicious person who takes an illegal action among the accumulators.

3. The monitoring apparatus according to claim 1, wherein the predetermined pattern is a pattern of an area where the matching target person possibly takes an illegal action.

4. The monitoring apparatus according to claim 1, wherein the predetermined area is an area, where the matching target person emerges with a high probability when taking an illegal action.

5. The monitoring apparatus according to claim 4, wherein the predetermined area is an area near a premium exchange counter, at which the matching target person emerges with a high probability when taking an illegal action in an amusement shop.

6. The monitoring apparatus according to claim 1, further comprising an alarm activator configured to activate an alarm that the matching target person is a suspicious person who takes an illegal action when the face image of the matching target person is matched with the face image of the accumulator in which the predetermined flag is registered in the accumulator database.

7. The monitoring apparatus according to claim 1, wherein the definitive registration unit makes the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, when the face image of the matching target person is captured in a predetermined area, and when the matching target person takes a predetermined behavioral pattern taken by a suspicious person.

8. A method for monitoring a monitoring apparatus comprising:
a plurality of cameras configured to capture a face image of a matching target person;
a face image storage configured to accumulate the face image of an accumulator in an accumulator database;
area storage configured to store an area where the face image is captured with respect to each of the plurality of cameras; and
a processing unit configured to operate as:
an area specifying unit configured to specify the area where the face image of the matching target person is captured by the plurality of cameras based on information stored in the area storage;
a matcher configured to perform matching by calculating a degree of similarity between the face image of the matching target person and the face image of the accumulator stored in the accumulator database; and
a matching determination unit configured to determine whether the face image of the matching target person is matched with the face image registered in the accumulator database by comparing the degree of similarity, which is of a matching result of the matcher, to a predetermined threshold;
the monitoring apparatus further comprising:
area history storage configured to store the area specified by the area specifying unit in an area history database while correlating the area with identification information identifying the face image of the accumulator when the face image of the matching target person is matched with the face image registered in the accumulator database;
wherein the processing unit is further configured to operate as:
a provisional registration unit configured to make a provisional registration of a predetermined flag while correlating the predetermined flag with the face image corresponding to the identification information in the accumulator database when a pattern of the area, which is stored in the area history database while correlated with the identification information of the face image, is a predetermined area pattern; and a definitive registration unit configured to make a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area, the monitoring method comprising:

an image capturing step, in the plurality of cameras, of capturing the face image of the matching target person;

an area specifying step, in the area specifying unit, of specifying the area where the face image of the matching target person is captured through the image capturing step based on the information stored in the area storage;

a matching step, in the matcher, of performing matching by calculating the degree of similarity between the face image of the matching target person and the face image of the accumulator stored in the accumulator database;

a matching determination step, in the matching determination unit, of determining whether the face image of the matching target person is matched with the face image registered in the accumulator database by comparing the degree of similarity, which is of the matching result in the matching step, to the predetermined threshold;

an area history storage step, in the area history storage, of storing the area specified through the area specifying step in the area history database while correlating the area with the identification information identifying the face image of the accumulator when the face image of the matching target person is matched with the face image registered in the accumulator database;

a provisional registration step, in the provisional registration unit, of making the provisional registration of the predetermined flag while correlating the predetermined flag with the face image corresponding to the identification information in the accumulator database when the pattern of the area, which is stored the area history database while correlated with the identification information of the face image, is the predetermined area pattern; and a definitive registration step, in the definitive registration unit, of making the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in the predetermined area.

9. A non-transitory computer-readable recording medium storing a program for causing a computer to perform processing, the computer controlling a monitoring apparatus comprising:

a plurality of cameras configured to capture a face image of a matching target person;

a face image storage configured to accumulate the face image of an accumulator in an accumulator database;

area storage configured to store an area where the face image is captured with respect to each of the plurality of cameras; and a processing unit configured to operate as:

an area specifying unit configured to specify the area where the face image of the matching target person is captured by the plurality of cameras based on information stored in the area storage;

a matcher configured to perform for performing matching by calculating a degree of similarity between the face image of the matching target person and the face image of the accumulator stored in the accumulator database;

a matching determination unit configured to determine whether the face image of the matching target person is matched with the face image registered in the accumulator database by comparing the degree of similarity, which is of a matching result of the matcher, to a predetermined threshold;

the monitoring apparatus further comprising:

area history storage configured to store the area specified by the area specifying unit in an area history database while correlating the area with identification information identifying the face image of the accumulator when the face image of the matching target person is matched with the face image registered in the accumulator database;

wherein the processing unit is further configured to operate as:

a provisional registration unit configured to make a provisional registration of a predetermined flag while correlating the predetermined flag with the face image corresponding to the identification information in the accumulator database when a pattern of the area, which is stored in the area history database while correlated with the identification information of the face image, is a predetermined area pattern; and a definitive registration unit configured to make a definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in a predetermined area, the processing comprising:

an image capturing step, in the plurality of cameras, of capturing the face image of the matching target person;

an area specifying step, in the area specifying unit, of specifying the area where the face image of the matching target person is captured through the image capturing step based on the information stored in the area storage;

a matching step, in the matcher, of performing matching by calculating the degree of similarity between the face image of the matching target person and the face image of the accumulator stored in the accumulator database;

a matching determination step, in the matching determination unit, of determining whether the face image of the matching target person is matched with the face image registered in the accumulator database by comparing the degree of similarity, which is of the matching result in the matching step, to the predetermined threshold;

an area history storage step, in the area history storage, of storing the area specified through the area specifying step in the area history database while correlating the area with the identification information identifying the face image of the accumulator when the face image of the matching target person is matched with the face image registered in the accumulator database;

a provisional registration step, in the provisional registration unit, of making the provisional registration of the predetermined flag while correlating the predetermined flag with the face image corresponding to the identification information in the accumulator database when the pattern of the area, which is stored in the area history database while correlated with the identification information of the face image, is the predetermined area pattern; and a definitive registration step, in the definitive registration unit, of making the definitive registration of the predetermined flag while correlating the predetermined flag with the face image of the matching target person in the accumulator database, when the face image of the matching target person is matched with the face image of the accumulator in which the provisional registration of the predetermined flag is made in the accumulator database, and when the face image of the matching target person is captured in the predetermined area.

* * * * *